(12) United States Patent
Yang et al.

(10) Patent No.: US 11,875,547 B2
(45) Date of Patent: Jan. 16, 2024

(54) IMAGE PROCESSING APPARATUS, IMAGE PROCESSING METHOD, AND STORAGE MEDIUM

(71) Applicants: Kabushiki Kaisha Toshiba, Tokyo (JP); Toshiba Digital Solutions Corporation, Kawasaki (JP)

(72) Inventors: Yeonsoo Yang, Machida (JP); Tamotsu Sato, Yokohama (JP); Hiroyuki Mizutani, Yokohama (JP)

(73) Assignees: Kabushiki Kaisha Toshiba, Tokyo (JP); Toshiba Digital Solutions Corporation, Kawasaki (JP)

( * ) Notice: Subject to any disclaimer, the term of this patent is extended or adjusted under 35 U.S.C. 154(b) by 439 days.

(21) Appl. No.: 17/306,091

(22) Filed: May 3, 2021

(65) Prior Publication Data

US 2021/0256325 A1    Aug. 19, 2021

Related U.S. Application Data

(63) Continuation of application No. PCT/JP2019/043334, filed on Nov. 5, 2019.

(30) Foreign Application Priority Data

Nov. 7, 2018  (JP) .................................. 2018-209738

(51) Int. Cl.
*G06V 10/22*  (2022.01)
*G06N 20/00*  (2019.01)
(Continued)

(52) U.S. Cl.
CPC .......... *G06V 10/235* (2022.01); *G06F 18/211* (2023.01); *G06F 18/2415* (2023.01);
(Continued)

(58) Field of Classification Search
CPC .... G06V 10/235; G06V 10/22; G06V 10/764; G06V 10/771; G06V 10/7788;
(Continued)

(56) References Cited

U.S. PATENT DOCUMENTS 7,688,363 B2   3/2010  Sato et al.
7,893,971 B2   2/2011  Sato et al.
(Continued)

FOREIGN PATENT DOCUMENTS

JP   H05101164 A   4/1993
JP   2001-156135 A   6/2001
(Continued)

OTHER PUBLICATIONS

A Statistical Approach to Set Classification by Feature Selection with Applications to Classification of Histopathology Images—2014 (Year: 2014).*

(Continued)

*Primary Examiner* — Nizar N Sivji
(74) *Attorney, Agent, or Firm* — Maier & Maier, PLLC

(57) ABSTRACT

An image processing apparatus according to an embodiment includes a processor. The processor acquires a classification result of classifying each of a plurality of regions set in a processing target image into one of a plurality of predetermined classes. The processor converts multidimensional data corresponding to each of the plurality of regions set in the image into low-dimensional data. The processor causes a display image including one or more regions to be displayed together with a plotted diagram including a plurality of plot points having different colors or patterns applied according to the classification result to the low-dimensional data in each of the plurality of regions, and in a case where an instruction for selecting a selected point from among the plot points is issued, the processor performs a discriminative (Continued)

display causing the selected point and a region corresponding to the selected point in the display image to be visually identifiable.

7 Claims, 20 Drawing Sheets

(51) Int. Cl.
| | |
|---|---|
| G06F 18/2415 | (2023.01) |
| G06F 18/211 | (2023.01) |
| G06F 18/2431 | (2023.01) |
| G06N 7/01 | (2023.01) |
| G06V 10/764 | (2022.01) |
| G06V 10/771 | (2022.01) |
| G06V 10/778 | (2022.01) |

(52) U.S. Cl.
CPC .......... G06F 18/2431 (2023.01); G06N 7/01 (2023.01); G06N 20/00 (2019.01); G06V 10/22 (2022.01); G06V 10/764 (2022.01); G06V 10/771 (2022.01); G06V 10/7788 (2022.01)

(58) Field of Classification Search
CPC .............. G06F 18/211; G06F 18/2415; G06F 18/2431; G06N 7/01; G06N 20/00; G06N 3/088

See application file for complete search history.

(56) References Cited

U.S. PATENT DOCUMENTS

| | | | |
|---|---|---|---|
| 2006/0274933 A1* | 12/2006 | Obara ..................... | G06T 7/001 382/149 |
| 2008/0231729 A1 | 9/2008 | Sato et al. | |
| 2011/0007961 A1* | 1/2011 | Iwanaga .............. | G06V 10/772 382/149 |
| 2011/0170769 A1* | 7/2011 | Sakimura ................ | G06F 18/40 382/159 |
| 2011/0222747 A1* | 9/2011 | Qian ....................... | G06F 18/24 382/128 |
| 2012/0229618 A1* | 9/2012 | Urano ................... | G06T 7/0004 348/92 |
| 2016/0371568 A1* | 12/2016 | Tin .................... | G06F 18/24155 |
| 2018/0246848 A1* | 8/2018 | Douglass .............. | G06N 10/00 |
| 2018/0289336 A1* | 10/2018 | Osawa .................. | G06T 7/0012 |
| 2019/0008429 A1 | 1/2019 | Yamamoto | |
| 2019/0357870 A1* | 11/2019 | Madabhushi ........ | G06V 10/764 |

FOREIGN PATENT DOCUMENTS

| | | |
|---|---|---|
| JP | 4042462 B2 | 2/2008 |
| JP | 4082714 B2 | 4/2008 |
| JP | 2009-129196 A | 6/2009 |
| JP | 2009-238992 A | 10/2009 |
| JP | 2011-089976 A | 5/2011 |
| JP | 2014-153906 A | 8/2014 |
| JP | 6742745 B2 | 8/2020 |
| JP | 6842745 B2 | 3/2021 |
| WO | WO 2009/119314 A1 | 10/2009 |
| WO | WO 2011/036846 A1 | 3/2011 |

OTHER PUBLICATIONS

Kiyuna, "e-Pathologist: Pathological image analysis system by artificial intelligence", Medical Imaging and Information Sciences, vol. 34, No. 2, 2017, 5 pages (with English abstract).

Imacel Academy, "Pathologist image analysis system "e-Pathologist"", Sep. 28, 2016, 6 pages (with English abstract).

* cited by examiner

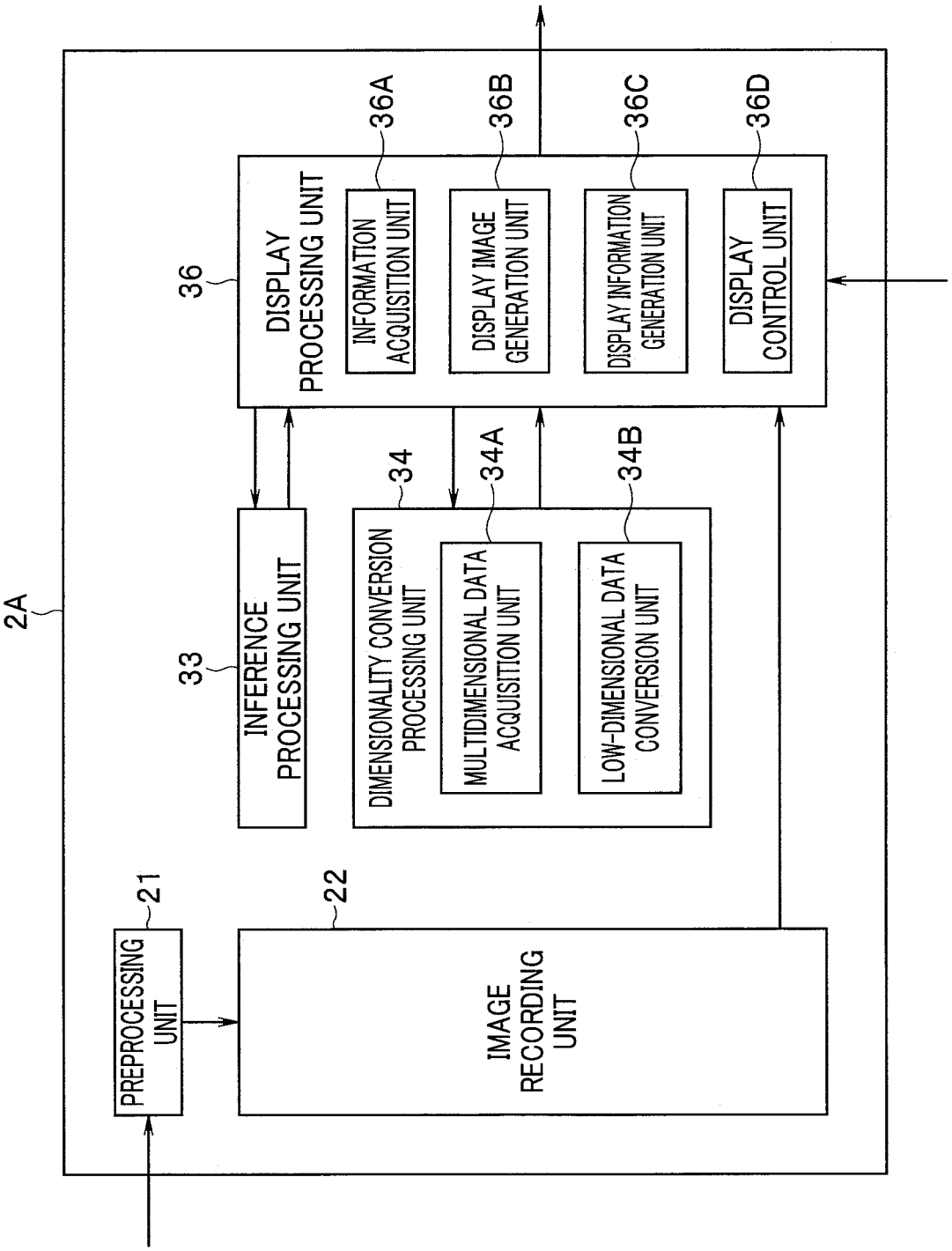

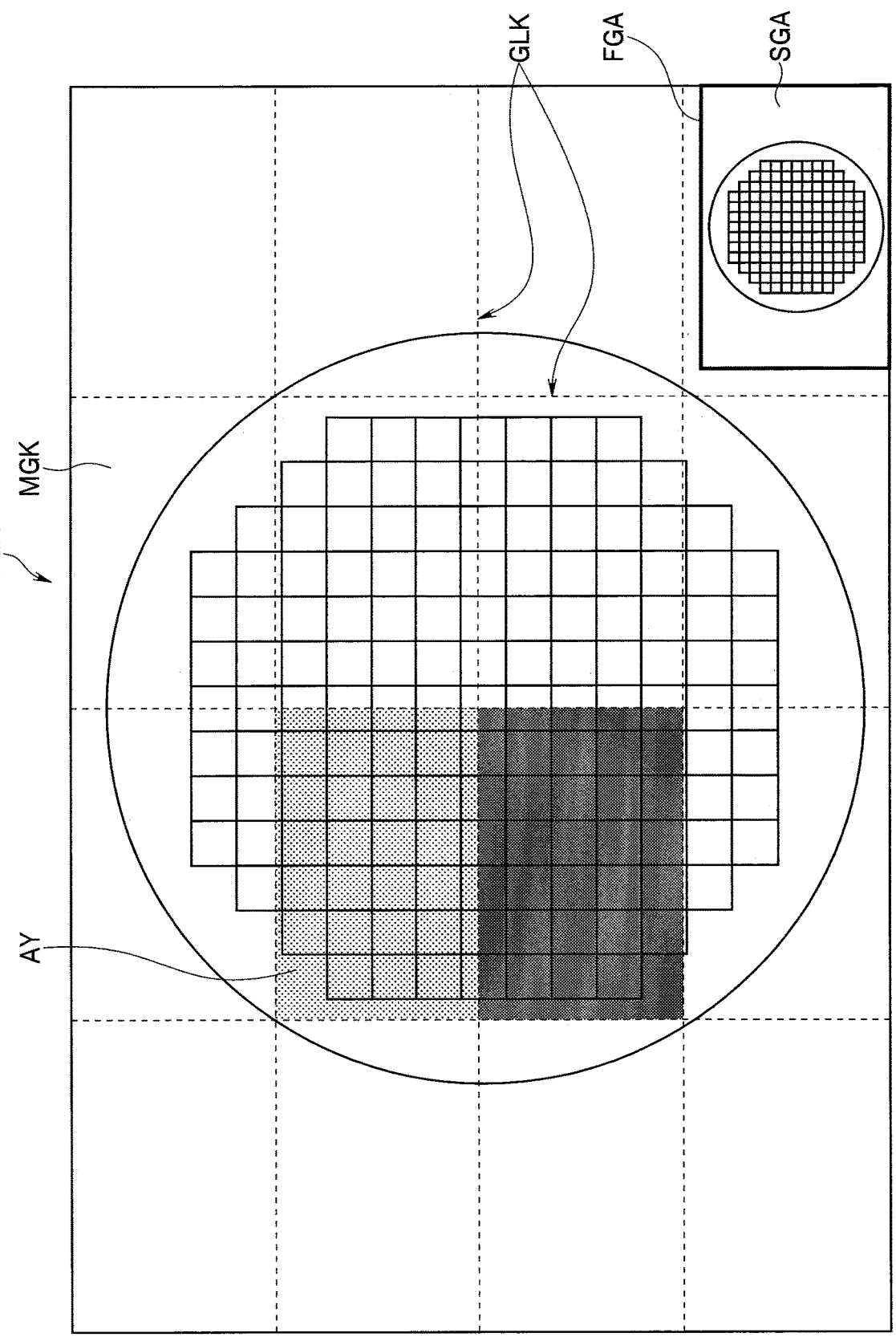

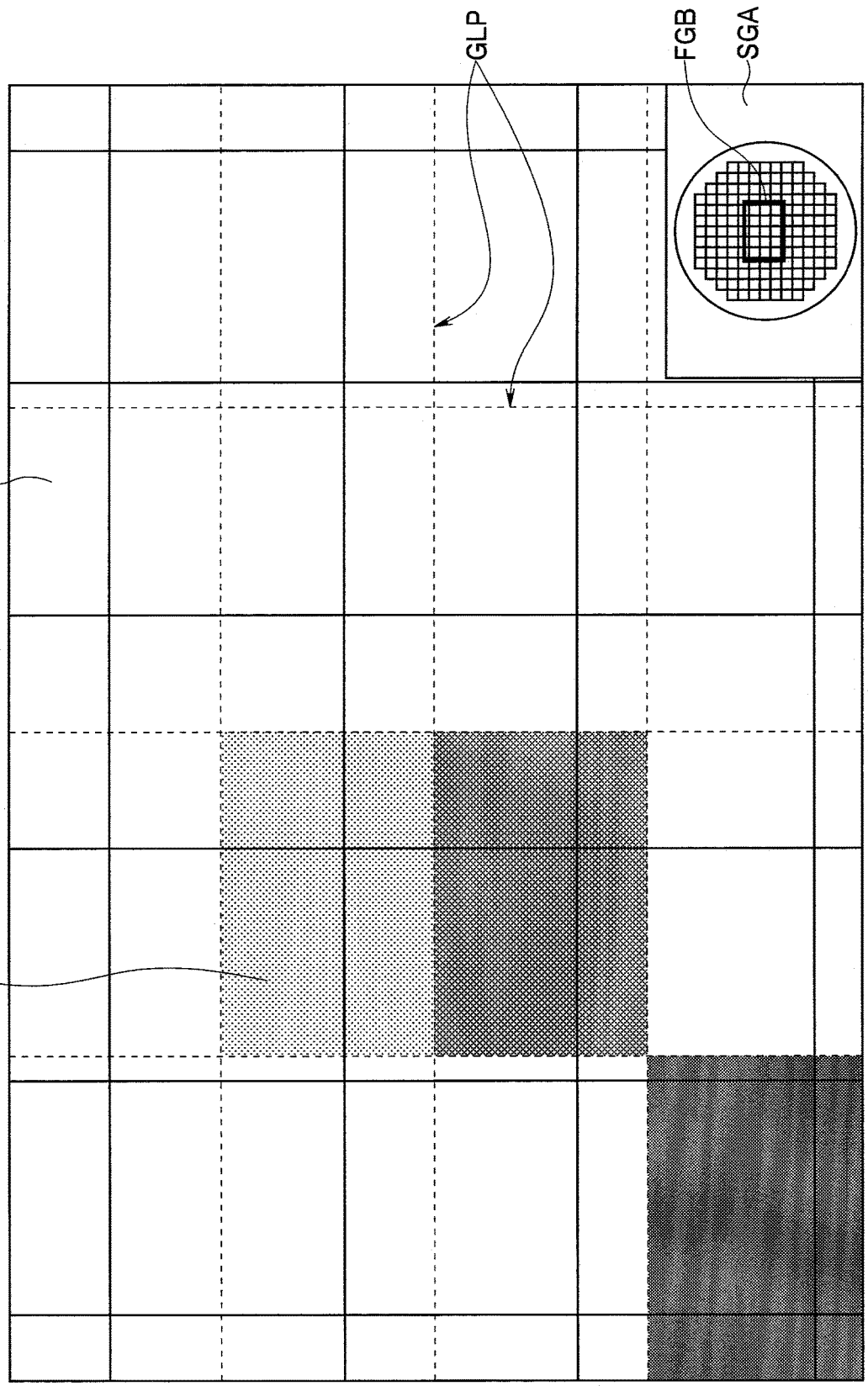

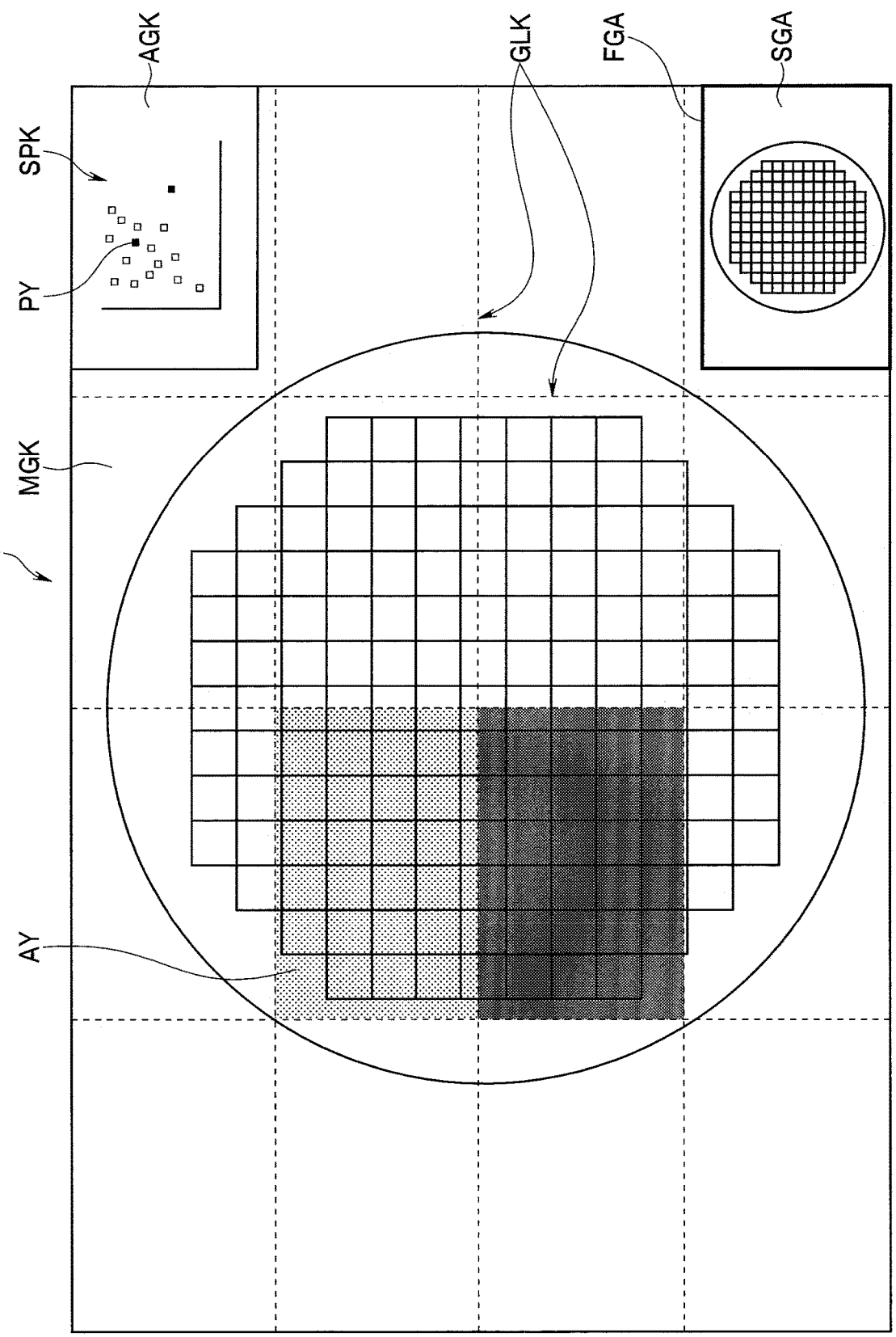

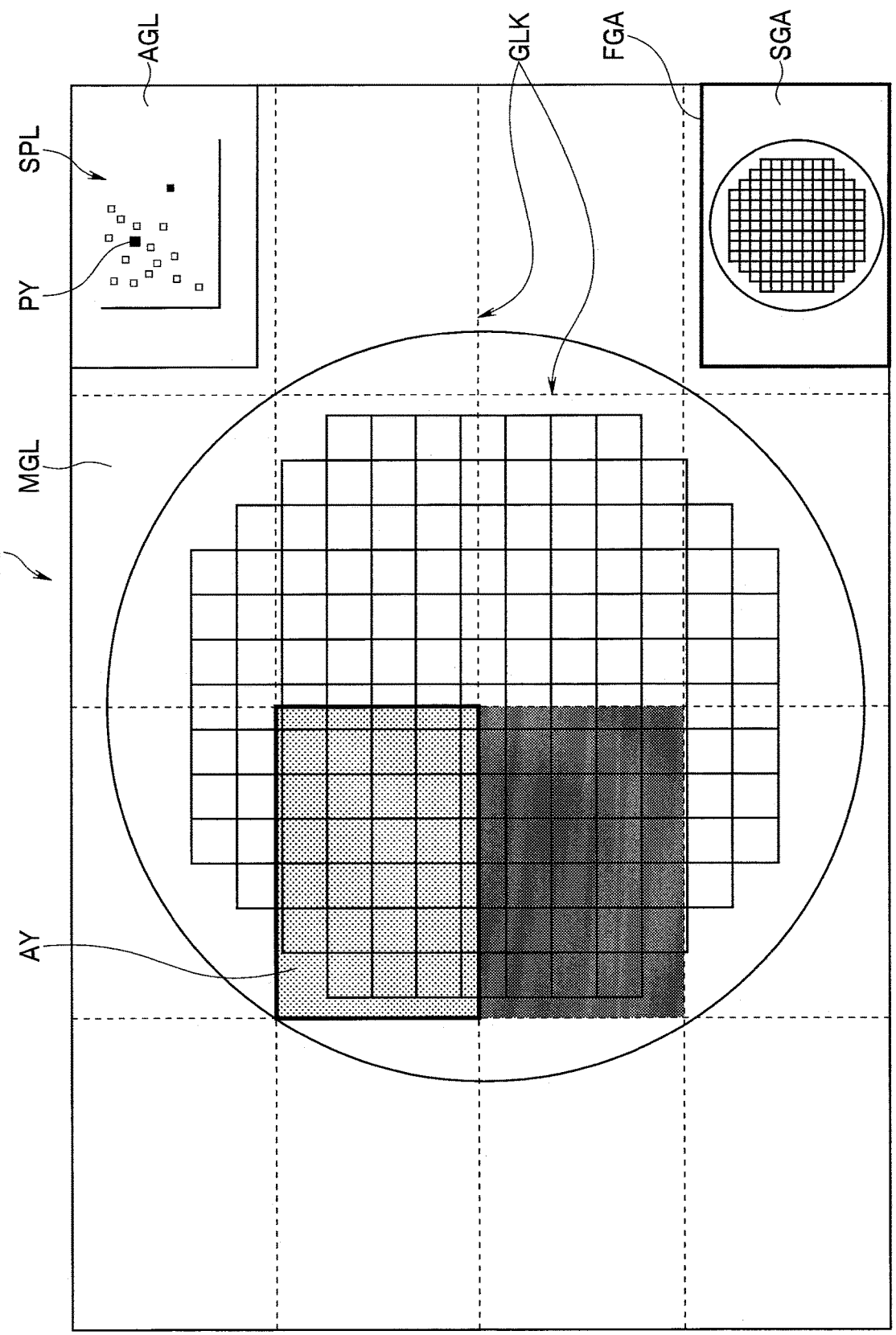

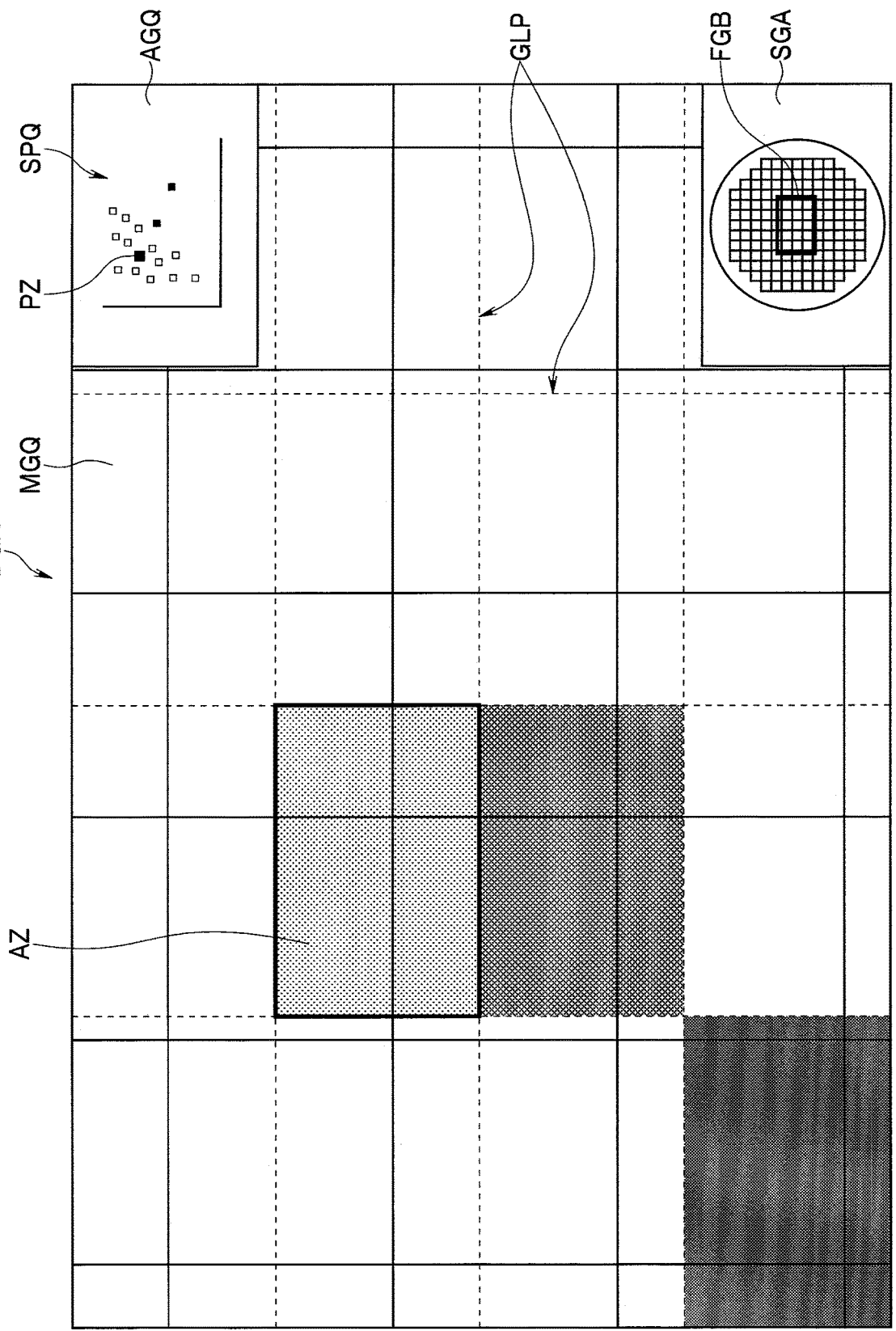

IMAGE PROCESSING APPARATUS, IMAGE PROCESSING METHOD, AND STORAGE MEDIUM

CROSS REFERENCE TO RELATED APPLICATION

This application is a continuation application of PCT/JP2019/043334 filed on Nov. 5, 2019 and claims benefit of Japanese Application No. 2018-209738 filed in Japan on Nov. 7, 2018, the entire contents of which are incorporated herein by this reference.

BACKGROUND OF THE INVENTION

1. Field of the Invention

Embodiments of the present invention relate to an image processing apparatus, an image processing method, and a storage medium.

2. Description of the Related Art

A method of setting a plurality of regions in an image and classifying each of the plurality of set regions into one of a plurality of predetermined classes to obtain a classification result has been known.

However, according to the known method, there is a problem of time-consuming work for specifying areas in the image where close inspection is necessary, such as areas where the likelihood of the classification result described above is low.

SUMMARY OF THE INVENTION

An image processing apparatus according to an embodiment is an image processing apparatus provided with a processor including hardware, in which the processor is configured to acquire a classification result of classifying each of a plurality of regions set in a processing target image into one of a plurality of predetermined classes, perform a process for acquiring multidimensional data corresponding to each of the plurality of regions set in the processing target image, and also perform a process for converting the multidimensional data into low-dimensional data, and perform a process for causing a display apparatus to display a display image including one or more of the plurality of regions together with a plotted diagram including a plurality of plot points generated by applying different colors or patterns according to the classification result to the low-dimensional data in each of the plurality of regions, and in a case where an instruction for selecting a desired plot point as a selected point from among the plot points contained in the plotted diagram is issued, perform a process related to discriminative display causing the selected point and a region corresponding to the selected point in the display image to be visually identifiable.

BRIEF DESCRIPTION OF THE DRAWINGS

FIG. 10 is a diagram illustrating an example of a configuration of an image processing apparatus according to a second embodiment;

FIG. 12A is a diagram illustrating an example of a display image displayed according to the process by the image processing apparatus according to the second embodiment;

FIG. 12B is a diagram illustrating an example of a display image displayed according to the process by the image processing apparatus according to the second embodiment;

FIG. 13A is a diagram illustrating an example of a display image displayed according to the process by the image processing apparatus according to the second embodiment;

FIG. 14A is a diagram illustrating an example of a display image displayed according to the process by the image processing apparatus according to the second embodiment;

FIG. 14B is a diagram illustrating an example of a display image displayed according to the process by the image processing apparatus according to the second embodiment;

DETAILED DESCRIPTION OF THE PREFERRED EMBODIMENTS

Hereinafter, embodiments will be described with reference to the drawings.

First Embodiment

FIGS. 1 to 9 relate to a first embodiment.

Figure 1:
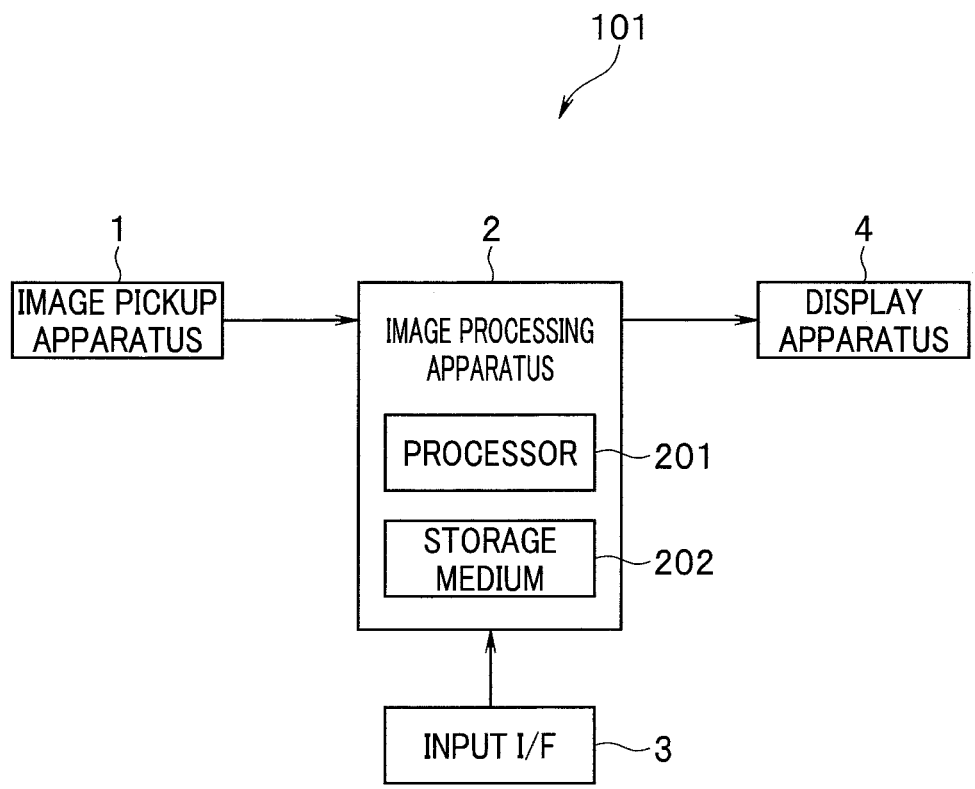
FIG. 1 is a diagram illustrating an example of a configuration of an image processing system including an image processing apparatus according to an embodiment.

As illustrated in FIG. 1, an image processing system 101 includes an image pickup apparatus 1, an image processing apparatus 2, an input interface (I/F) 3, and a display apparatus 4. FIG. 1 is a diagram illustrating an example of a configuration of an image processing system including an image processing apparatus according to an embodiment.

The image pickup apparatus 1 includes an image sensor, for example. The image pickup apparatus 1 is configured to perform image pickup of an object to acquire an image, and also output the acquired image to the image processing apparatus 2. Note that in the present embodiment, an ID number of an object picked up by the image pickup apparatus 1 is described as being added in advance as additional information about the image obtained by performing image pickup of the object.

The image processing apparatus 2 is configured as a computer including one or more processors 201 and a storage medium 202, for example. In addition, the image processing apparatus 2 is configured to generate a display image by processing the image outputted from the image pickup apparatus 1, and also output the generated display image to the display apparatus 4. The image processing apparatus 2 is configured to detect an instruction outputted from the input I/F 3, generate information such as the display image according to the detected instruction, and output the generated information to the display apparatus 4.

The input I/F 3 includes a user-operable input device such as a mouse, a keyboard or a touch panel. The input I/F 3 is configured to be capable of issuing an instruction for setting a magnification of a main image (described later) included in the display image displayed on the display apparatus 4 to a desired magnification. The input I/F 3 is configured to be capable of issuing an instruction for setting a position of interest that corresponds to a center point when displaying the main image on a display screen of the display apparatus 4 and also corresponds to a reference point when changing the magnification of the main image. The input I/F 3 is configured to be capable of issuing an instruction for selecting a desired position in the main image displayed on the display apparatus 4 as a selected position. The input I/F 3 is configured to be capable of issuing an instruction for selecting a desired plot point from among plot points contained in a two-dimensional scatter diagram (described later) displayed on the display apparatus 4.

The display apparatus 4 includes a liquid crystal display monitor, for example. In addition, the display apparatus 4 is configured to be capable of displaying the display image outputted from the image processing apparatus 2, display information, and the like.

Figure 2:
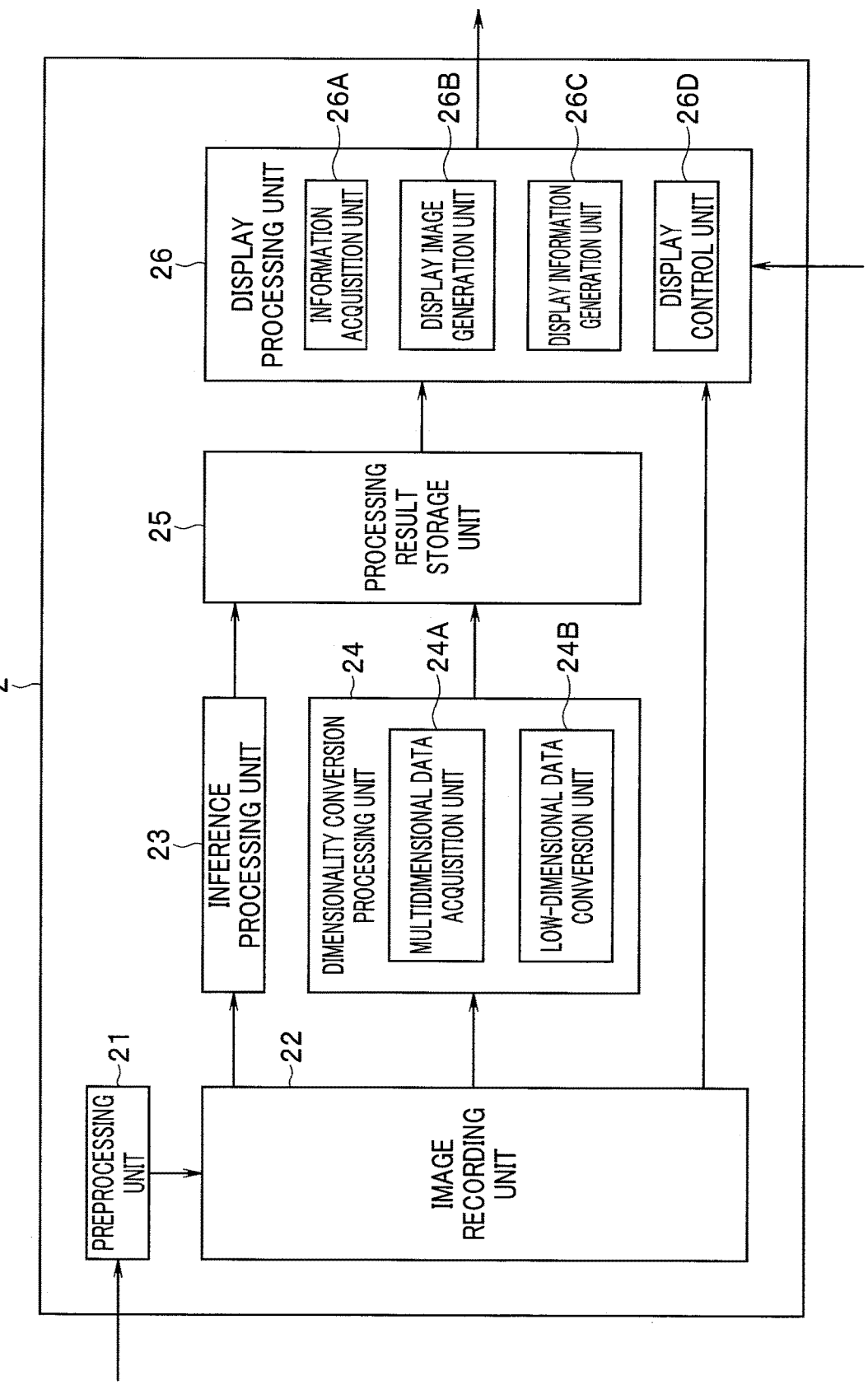
FIG. 2 is a diagram illustrating an example of a configuration of an image processing apparatus according to a first embodiment.

For example, as illustrated in FIG. 2, the image processing apparatus 2 includes a preprocessing unit 21, an image recording unit 22, an inference processing unit 23, a dimensionality conversion processing unit 24, a processing result storage unit 25, and a display processing unit 26. FIG. 2 is a diagram illustrating an example of a configuration of an image processing apparatus according to the first embodiment.

The preprocessing unit 21 is configured to perform a conversion process for converting the resolution of an image outputted from the image pickup apparatus 1, and thereby generate a plurality of images having mutually different resolutions. The preprocessing unit 21 is configured to output the plurality of images generated as above to the image recording unit 22.

The image recording unit 22 is configured to record the plurality of images outputted from the preprocessing unit 21 for each ID number of the object.

Note that the following description assumes that P images having N mutually different resolutions R1, R2, . . . , RN are generated by the preprocessing unit 21, and the generated P images are recorded in the image recording unit 22 for each ID number of the object. The following description assumes that the resolutions of the P images generated by the preprocessing unit 21 satisfy the relationship R1<R2< . . . <RN. In the present embodiment, it is sufficient for at least one image each for the resolutions R1 to RN to be included in the P images.

The inference processing unit 23 is configured to read an image GRN having the highest resolution RN from among the P images recorded to the image recording unit 22, and set S (where S≥2) regions in the read image GRN.

Note that in the present embodiment, the S regions set by the process by the inference processing unit 23 and the dimensionality conversion processing unit 24 are described as being rectangular regions. In the present embodiment, the methods of setting the S regions by the inference processing unit 23 and the dimensionality conversion processing unit 24 are described as being the same.

The inference processing unit 23 is configured to perform, on each of the S regions set in the image GRN, a process for acquiring classification information that corresponds to information indicating a classification result of classifying each region into one of a plurality of predetermined classes, and a process for acquiring likelihood information that corresponds to information indicating a result of calculating the likelihood of the classification result. In addition, the inference processing unit 23 is configured to output the classification information and the likelihood information corresponding to each of the S regions set in the image GRIN to the processing result storage unit 25 in association with the ID number of the object.

In other words, the inference processing unit 23 is configured to perform a process for acquiring a classification result of classifying each of the plurality of regions set in the image GRN (processing target image) into one of a plurality of predetermined classes, and a process for calculating the likelihood of the classification result in each of the plurality of regions.

Note that in the present embodiment, the inference processing unit 23 is configured to use a multilayer neural network containing an input layer, a hidden layer, and an output layer as a type of statistical model constructed through machine learning, for example. Furthermore, in the present embodiment, the inference processing unit 23 is configured to treat each coupling coefficient (weight) included in the above neural network as an inference model trained by deep learning (machine learning). Supervised learning is performed in the inference processing unit 23. In the inference processing unit 23 of the present embodiment, in the case where multidimensional data such as pixel values or feature vectors obtained from each pixel included in a given region from among the S regions set in the image GRN is inputted into the input layer of the neural network, for example, output data expressing a classification result obtained by classifying the given region into one of the plurality of predetermined classes and the likelihood of the classification result for the given region is outputted from the output layer of the neural network. Note that in the inference processing unit 23, classification is performed on the basis of the magnitude of the likelihood, but the output value of each node in the output layer of the neural network is used as one example of the likelihood calculated by the statistical model described above (the likelihood is not calculated again by a separate process). In general, in the training of a discriminative function using a neural network, the node outputs of the output layer are trained to be in a correct answer category 1 or an incorrect answer category 0. During inference, the closer the output is to 1, the more plausible is the occurrence of the category assigned to the node (high likelihood), and conversely, the closer the output is to 0, the less plausible is the occurrence (low likelihood). The likelihood is expressed as a value for each type of class, and in the case of a binary classification problem as described later, normal is 0.8 and abnormal is 0.2 (for a total value of 1), and the likelihood is inferred normally as the classification result.

The dimensionality conversion processing unit 24 includes a multidimensional data acquisition unit 24A and a low-dimensional data conversion unit 24B.

The multidimensional data acquisition unit 24A is configured to read the image GRN from among the P images recorded to the image recording unit 22, and set S regions in the read image GRN.

The multidimensional data acquisition unit 24A is configured to perform a process for acquiring multidimensional data corresponding to each of the S regions set in the image GRN. Specifically, for example, the multidimensional data acquisition unit 24A is configured to perform a process for acquiring a pixel value of each pixel included in one of the S regions for each of the S regions set in the image GRN. As another example, the multidimensional data acquisition unit 24A is configured to perform a process for calculating a feature vector corresponding to a pixel value of each pixel included in one of the S regions for each of the S regions set in the image GRN.

The low-dimensional data conversion unit 24B is configured to perform a process for converting the multidimensional data obtained as a processing result from the multidimensional data acquisition unit 24A into low-dimensional data. Specifically, for example, the low-dimensional data conversion unit 24B is configured to perform a process for converting each pixel value acquired from one of the S regions into two-dimensional data for each of the S regions set in the image GRN. As another example, the low-dimensional data conversion unit 24B is configured to perform a process for converting a feature vector calculated in one of the S regions into two-dimensional data for each of the S regions set in the image GRN.

The low-dimensional data conversion unit 24B is configured to output information associating the two-dimensional data acquired in each of the S regions set in the image GRN with the ID number of the object to the processing result storage unit 25.

In other words, the dimensionality conversion processing unit 24 is configured to perform a process for acquiring multidimensional data corresponding to each of a plurality of regions set in the image GRN (processing target image), and also perform a process for converting the multidimensional data into low-dimensional data. In the present embodiment, a clustering method may also be used in the dimensionality conversion processing unit 24.

Note that in the present embodiment, the dimensionality conversion processing unit 24 may also be configured to include a neural network configured using an autoencoder, for example. In addition, the dimensionality conversion processing unit 24 of the present embodiment may also be configured to input the multidimensional data obtained from the image GRN into the neural network described above, and also extract two-dimensional data corresponding to the multidimensional data from the hidden layer of the neural network. The dimensionality conversion processing unit 24 of the present embodiment may also be configured to perform a process for acquiring the likelihood and reconstruction error corresponding to multidimensional data obtained from the image GRN as two-dimensional data on the basis of output data obtained by inputting the multidimensional data into the neural network described above. Unsupervised learning is performed in the dimensionality conversion processing unit 24.

The processing result storage unit 25 is configured to store the information outputted from the inference processing unit 23 and the information outputted from the dimensionality conversion processing unit 24 for each ID number of the object. In other words, classification information indicating the classification result obtained by classifying each of the S regions set in the image GRN into one of a plurality of predetermined classes, likelihood information corresponding to the classification information of each of the S region, and two-dimensional data acquired in each of the S regions are stored in the processing result storage unit 25 in association with the ID number of the object.

The display processing unit 26 includes an information acquisition unit 26A, a display image generation unit 26B, a display information generation unit 26C, and a display control unit 26D.

The information acquisition unit 26A is configured to detect an instruction issued through the input I/F 3, and also perform a process for acquiring information to be used in processes by the display image generation unit 26B, the display information generation unit 26C, and the display control unit 26D on the basis of the detected instruction. Specifically, on the basis of the result of detecting an instruction issued through the input I/F 3, the information acquisition unit 26A is configured to perform a process for acquiring each of information indicating the magnification of the main image displayed on the display apparatus 4, information indicating the position of interest set in the main image, information indicating a selected position selected in the main image, and information indicating a selected point selected from among plot points contained in a two-dimensional scatter diagram displayed on the display apparatus 4 together with the main image.

The display image generation unit 26B is configured to use at least one of the P images recorded to the image recording unit 22 to generate a main image according to the magnification and the position of interest included in the information acquired by the information acquisition unit 26A. In other words, in the main image generated by the display image generation unit 26B, the position of interest included in the information acquired by the information acquisition unit 26A is aligned with the center of the display screen, and the main image is displayed on the display apparatus 4 as an image at the magnification included in the information. The display image generation unit 26B is configured to generate a sub-image by reducing the image GRN, for example. The display image generation unit 26B is configured to generate a display image by superimposing the sub-image onto a predetermined region in the main image. The display image generation unit 26B is configured to specify the display range of the main image being displayed on the display apparatus 4 out of the image GRN on the basis of the magnification and the position of interest included in the information acquired by the information acquisition unit 26A, and also superimpose a rectangular frame indicating the specified display range onto the sub-image.

The display information generation unit 26C is configured to generate display information according to the information read from the processing result storage unit 25. Specifically, the display information generation unit 26C is configured to generate a two-dimensional scatter diagram corresponding to a plotted diagram in which the S pieces of two-dimensional data included in the information read from the processing result storage unit 25 are plotted as coordinates in a planar coordinate system. The display information generation unit 26C is configured to apply different colors or patterns according to the classification information included in the information read from the processing result storage unit 25 to each of the S plot points contained in the two-dimensional scatter diagram generated as described above. The display information generation unit 26C is configured to generate visual information for visually indicating the classification information and the likelihood information corresponding to an inference result included in the information read from the processing result storage unit 25 in the main image generated by the display image generation unit 26B.

The display control unit 26D is configured to perform a process for causing the display apparatus 4 to display the display image generated by the display image generation unit 26B. In a case of detecting that an instruction for causing the display apparatus 4 to display analysis support information corresponding to information for supporting the analysis of the main image by the user has been issued through the input I/F 3, the display control unit 26D is configured to perform a process for combining and displaying an analysis support image including the two-dimensional scatter diagram generated by the display information generation unit 26C with the display image being displayed on the display apparatus 4. In a case of detecting that an instruction for causing the display apparatus 4 to display an inference result obtained by the inference processing unit 23 has been issued through the input I/F 3, the display control unit 26D is configured to perform a process for combining and displaying visual information generated by the display information generation unit 26C with the display image (main image) being displayed on the display apparatus 4. The display control unit 26D is configured to perform a process (described later) for changing the display mode of the main image and the two-dimensional scatter diagram being displayed on the display apparatus 4 according to the selected position included in the information acquired by the information acquisition unit 26A. The display control unit 26D is configured to perform a process (described later) for changing the display mode of the main image and the two-dimensional scatter diagram being displayed on the display apparatus 4 according to the selected point included in the information acquired by the information acquisition unit 26A.

In other words, the display processing unit 26 is configured to perform a process for causing the display apparatus 4 to display the display image (main image) including one or more of the S regions set in the image GRN together with the plotted diagram (two-dimensional scatter diagram) including a plurality of plot points generated by applying different colors or patterns according to the classification result obtained by the inference processing unit 23 to the low-dimensional data (two-dimensional data) in each of the S regions. The display processing unit 26 is configured to perform a process for generating a two-dimensional scatter diagram including a plurality of plot points generated by applying colors or patterns according to the classification result obtained by the inference processing unit 23 to the two-dimensional data in each of the S regions set in the image GRN. The display processing unit 26 is configured to perform a process for causing the display apparatus 4 to combine and display visual information according to the classification result and the likelihood obtained by the inference processing unit 23 with the display image (main image).

Note that in the present embodiment, the function of each unit of the image processing apparatus 2 may also be achieved by hardware including a processor 201 and a storage medium 202. Alternatively, in the present embodiment, a program for achieving the function of each unit of the image processing apparatus 2 may be stored in the storage medium 202, and the processor 201 may read and execute the program. Examples of the computer-readable storage medium 202 include an optical disc such as CD-ROM, a phase change optical disc such as DVD-ROM, a magneto-optical (MO) disc such as MiniDisc (MD), a magnetic disk such as a floppy (registered trademark) disk or a removable hard disk, or a memory card such as Compact-Flash (registered trademark), SmartMedia, SD memory card, or Memory Stick. A hardware device such as an integrated circuit (such as an IC chip) specially designed and configured for the object of the present invention may also be included as the storage medium.

Figure 3A:
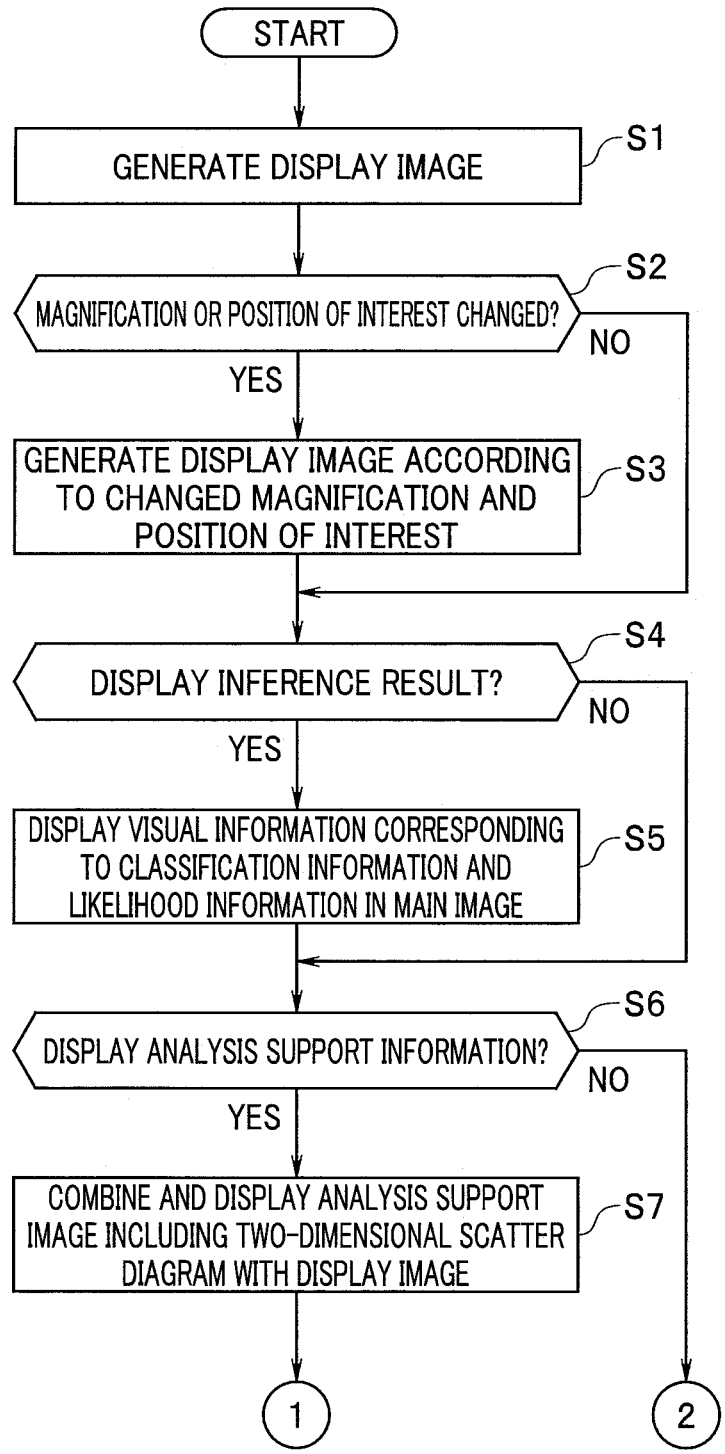
FIG. 3A is a flowchart illustrating a portion of a specific example of a process performed in the image processing apparatus according to the first embodiment.
Figure 3B:
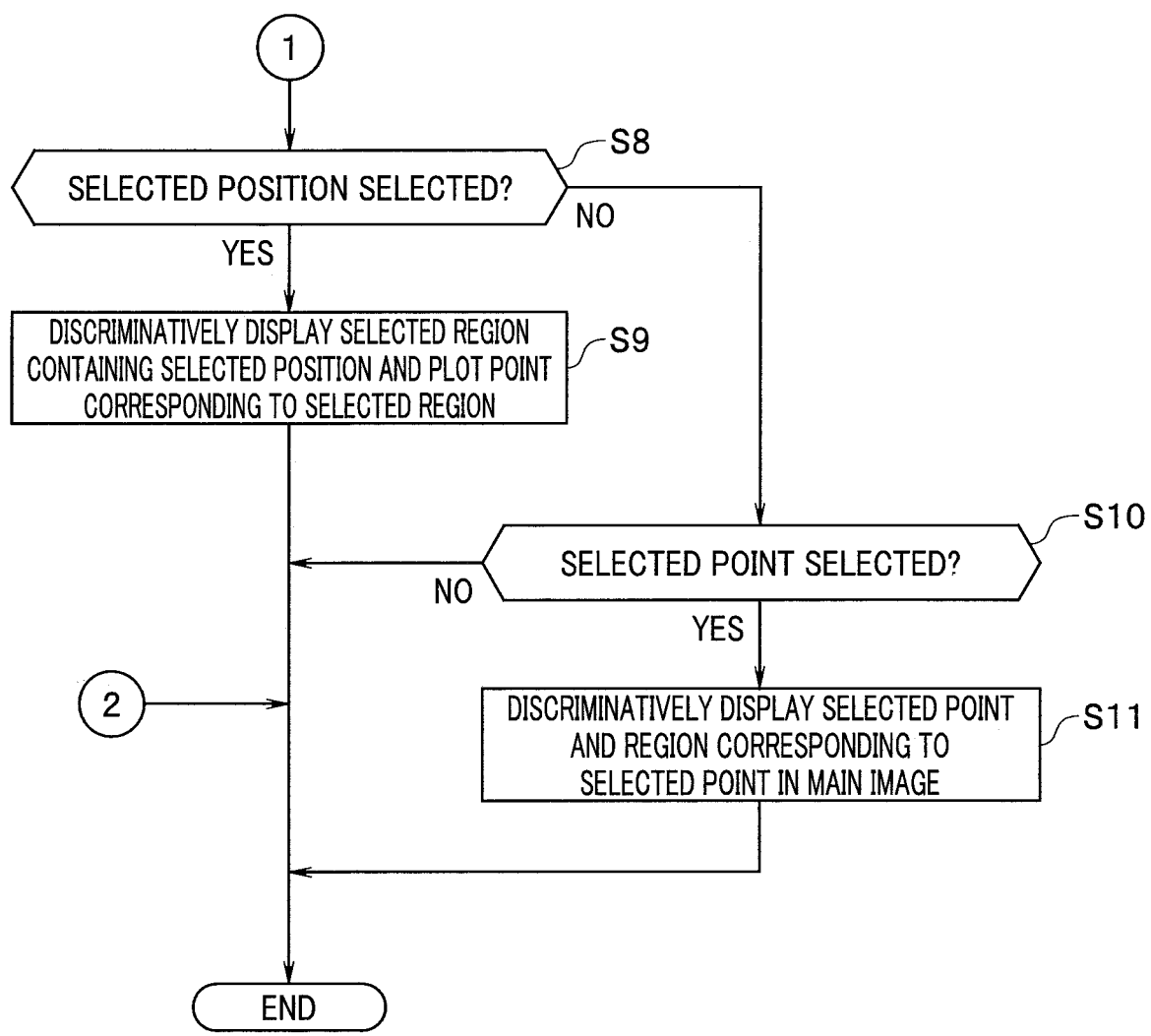
FIG. 3B is a flowchart illustrating a continuation of the process in FIG. 3A.

Next, the action of the present embodiment will be described with reference to diagrams such as FIGS. 3A and 3B. FIG. 3A is a flowchart illustrating a portion of a specific example of a process performed in the image processing apparatus according to the first embodiment. FIG. 3B is a flowchart illustrating a continuation of the process in FIG. 3A.

Note that the present embodiment will be described by taking the example of a case where an image obtained by performing image pickup of a semiconductor wafer and a plurality of chips formed on the semiconductor wafer as the object is outputted from the image pickup apparatus 1 to the image processing apparatus 2, and P images corresponding to the outputted image are generated by the preprocessing unit 21. In the present embodiment, a process for acquiring classification information indicating a classification result of classifying each of the S regions set in the image GRN into one of the two classes "normal" and "abnormal" is described as being performed by the inference processing unit 23. In the present embodiment, a process for acquiring likelihood information indicating the result of calculating the likelihood of the classification result in each region classified into the "normal" class (hereinafter also referred to as a normal region) and the result of calculating the likelihood of the classification result in each region classified into the "abnormal" class (hereinafter also referred to as an abnormal region) is described as being performed by the inference processing unit 23.

The display image generation unit 26B performs a process for generating a display image including a main image and a sub-image using at least one of the P images recorded to the image recording unit 22 on the basis of the magnification and the position of interest included in the information acquired by the information acquisition unit 26A (step S1 in FIG. 3A).

Figure 4:
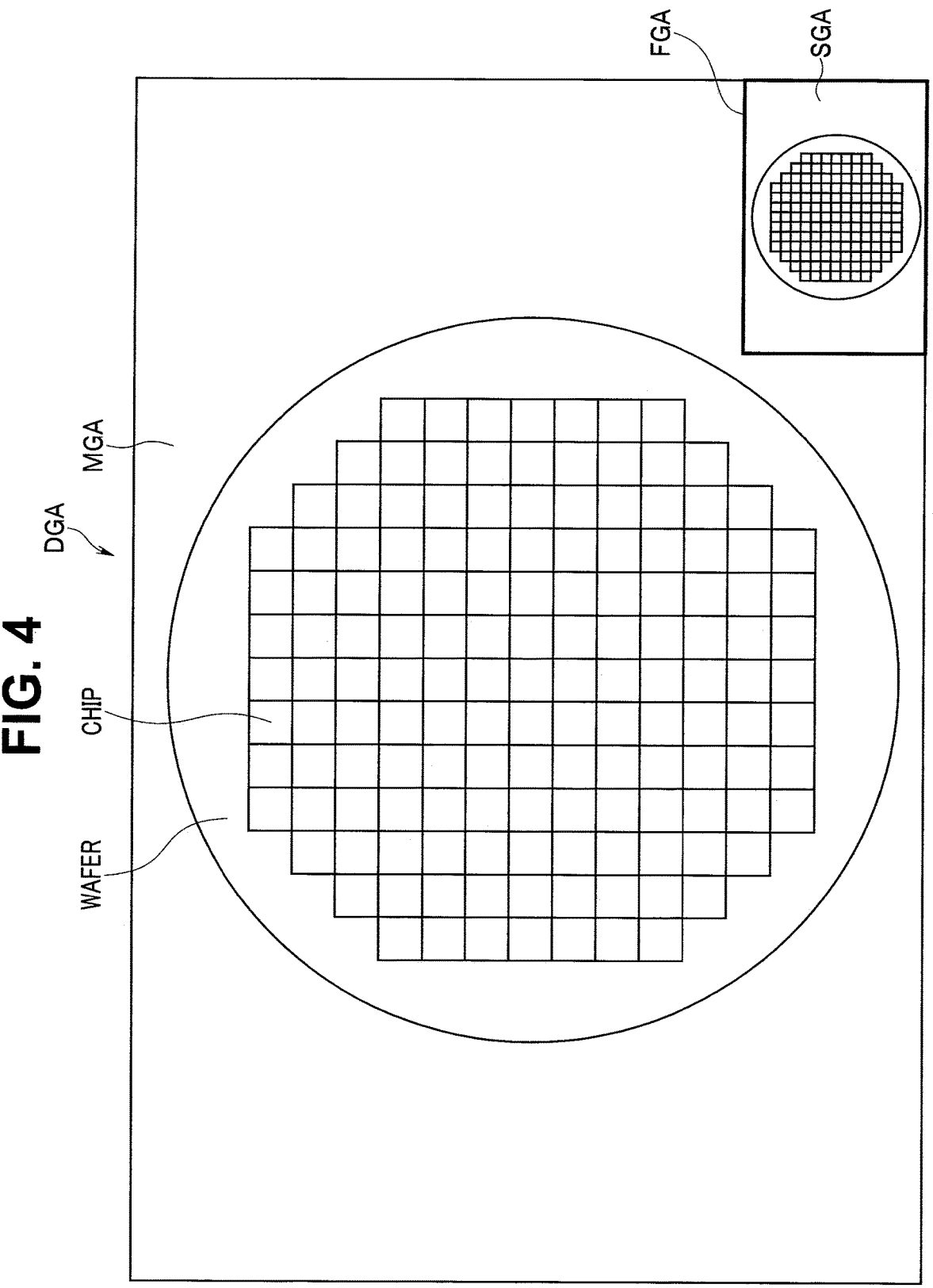
FIG. 4 is a diagram illustrating an example of a display image displayed according to the process by the image processing apparatus according to the first embodiment.

Specifically, for example, in a default state corresponding to the state in which an instruction related to setting the magnification and the position of interest has not been issued, the display image generation unit 26B performs a process for generating a display image using the image GRN read from the image recording unit 22. According to such a process, a display image DGA including a main MGA and a sub-image SGA as illustrated in FIG. 4 is displayed on the display apparatus 4, for example. FIG. 4 is a diagram illustrating an example of a display image displayed according to the process by the image processing apparatus according to the first embodiment.

The main image MGA corresponds to an image in which the entirety of the image GRN is set as the display range. The sub-image SGA corresponds to a reduced image of the image GRN. In the display image DGA in FIG. 4, a rectangular frame FGA indicating that the entirety of the image GRN is the display range of the main image MGA is superimposed onto the outermost part of the sub-image SGA.

The display image generation unit 26B performs a determination process regarding whether or not the magnification or the position of interest included in the information acquired by the information acquisition unit 26A has changed from the state of step S1 in FIG. 3A (step S2 in FIG. 3A).

In the case of obtaining a determination result indicating that the magnification or the position of interest included in the information acquired by the information acquisition unit 26A has changed from the state in step S1 in FIG. 3A (S2: YES), the display image generation unit 26B performs a process for generating a display image according to the changed magnification and the position of interest (step S3 in FIG. 3A). In the case of obtaining a determination result indicating that neither the magnification nor the position of interest included in the information acquired by the information acquisition unit 26A has changed from the state of step S1 in FIG. 3A (S2: NO), the process of step S3 in FIG. 3A is skipped.

Figure 5:
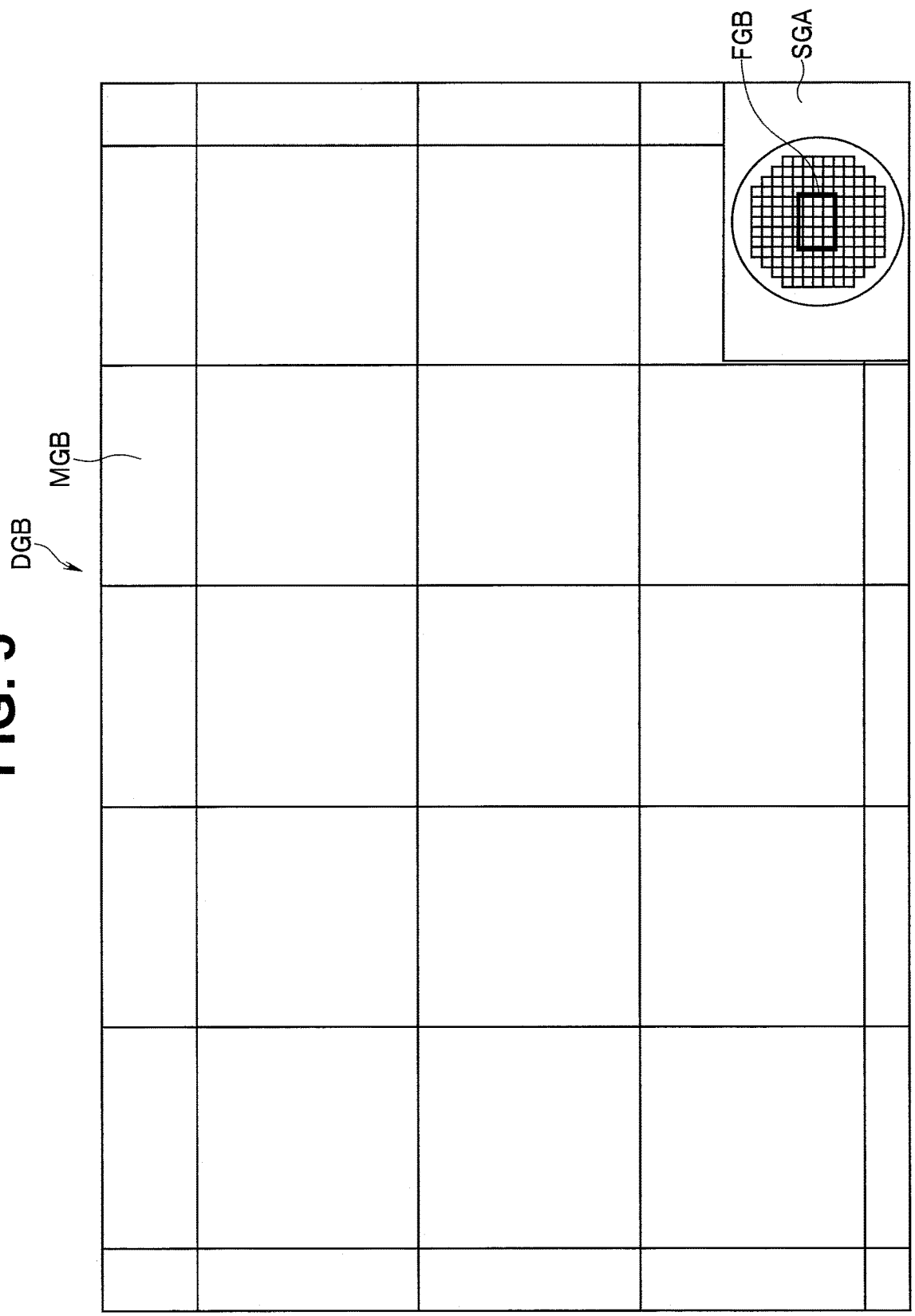
FIG. 5 is a diagram illustrating an example of a display image displayed according to the process by the image processing apparatus according to the first embodiment.

At this point, in the case where the process of step S3 in FIG. 3A is performed, a display image DGB including a main image MGB and the sub-image SGA as illustrated in FIG. 5 is displayed on the display apparatus 4, for example. FIG. 5 is a diagram illustrating an example of a display image displayed according to the process by the image processing apparatus according to the first embodiment.

The main image MGB corresponds to an image obtained by enlarging the main image MGA according to the magnification included in the information acquired by the information acquisition unit 26A with an area near the center of the main image MGA set as the position of interest. In the display image DGB, a rectangular frame FGB indicating that the area near the center of the image GRN is the display range of the main image MGB is superimposed inside the sub-image SGA.

After the process of step S2 or step S3 in FIG. 3A is performed, the display control unit 26D performs a determination process regarding whether or not an instruction for causing the display apparatus 4 to display an inference result obtained by the inference processing unit 23 has been issued through the input I/F 3 (step S4 in FIG. 3A).

In the case of obtaining a determination result indicating that an instruction for causing the display apparatus 4 to display the inference result obtained by the inference processing unit 23 has been issued (S4: YES), the display control unit 26D performs a process for combining and displaying visual information generated by the display information generation unit 26C, that is, visual information according to the classification information and the likelihood information stored in the processing result storage unit 25, with the display image being displayed on the display apparatus 4 (step S5 in FIG. 3A). In the case of obtaining a determination result indicating that an instruction for causing the display apparatus 4 to display the inference result obtained by the inference processing unit 23 has not been issued (S4: NO), the process of step S5 in FIG. 3A is skipped and the process of step S6 is performed.

Figure 6:
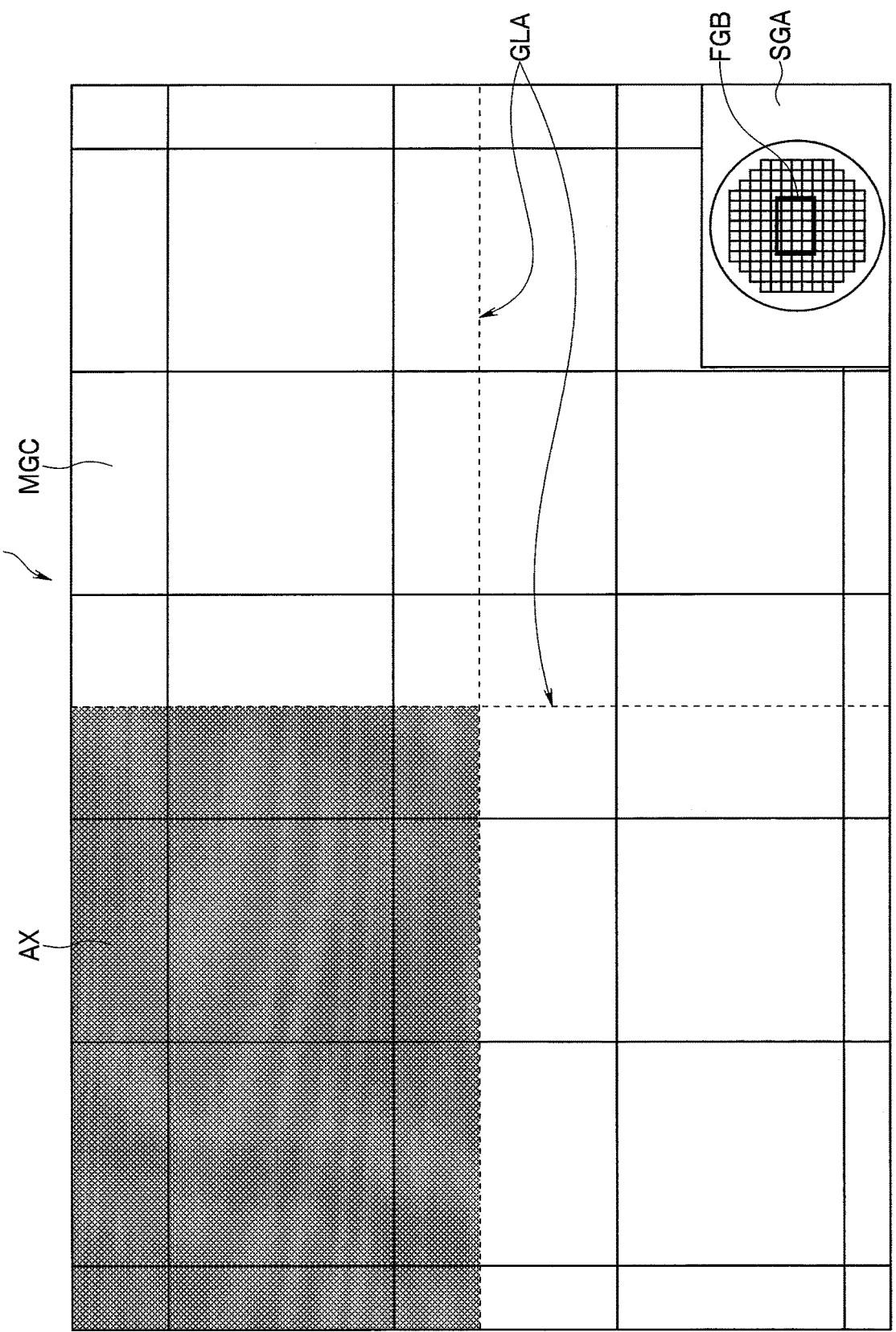
FIG. 6 is a diagram illustrating an example of a display image displayed according to the process by the image processing apparatus according to the first embodiment.

At this point, in the case where the process of step S5 in FIG. 3A is performed in the state in which the display image DGB is being displayed on the display apparatus 4, a display image DGC including a main image MGC and the sub-image SGA as illustrated in FIG. 6 is displayed on the display apparatus 4, for example. FIG. 6 is a diagram illustrating an example of a display image displayed according to the process by the image processing apparatus according to the first embodiment.

In the main image MGC, grid lines GLA indicating the set state of the S regions set in the image GRN are drawn with dashed lines.

In the main image MGC, the inference results corresponding to four regions divided by the grid lines GLA are illustrated from among the inference results obtained in each of the S regions.

Specifically, for example, of the four regions divided by the grid lines GLA in the main image MGC, one region AX superimposed with a hatching pattern is illustrated as an abnormal region, and the three regions not superimposed with the hatching pattern other than the region AX are illustrated as normal regions.

In the present embodiment, the density of the hatching pattern superimposed onto the region AX in the main image MGC may be changed according to the magnitude of the likelihood indicated by the likelihood information read from the processing result storage unit 25, for example.

In the present embodiment, normal regions and abnormal regions included in the main image MGC may also be colored with different colors according to the classification information read from the processing result storage unit 25, for example. In the present embodiment, the density of the color applied to normal regions of the main image MGC and the density of the color applied to abnormal regions of the main image MGC may also be respectively changed according to the magnitude of the likelihood indicated by the likelihood information read from the processing result storage unit 25, for example.

According to the present embodiment, an instruction for causing only the inference results corresponding to normal regions to be displayed in the main image may also be issued through the input I/F 3, for example. According to the present embodiment, an instruction for causing only the inference results corresponding to abnormal regions to be displayed in the main image may also be issued through the input IX 3, for example.

According to the present embodiment, in step S5 in FIG. 3A, a process may be performed according to a determination result obtained by applying a threshold determination to the likelihood indicated by the likelihood information read from the processing result storage unit 25, for example. Specifically, according to the present embodiment, the display control unit 26D may perform a process for combining visual information only for regions where the likelihood indicated by the likelihood information read from the processing result storage unit 25 is less than a predetermined threshold among the S regions set in the main image, for example. As another example, according to the present embodiment, the display control unit 26D may perform a process for combining visual information only for regions where the likelihood indicated by the likelihood information read from the processing result storage unit 25 is a predetermined threshold or higher among the S regions set in the main image, for example.

After the process of step S4 or step S5 in FIG. 3A is performed, the display control unit 26D performs a determination process regarding whether or not an instruction for causing the display apparatus 4 to display analysis support information has been issued through the input I/F 3 (step S6 in FIG. 3A).

In the case of obtaining a determination result indicating that an instruction for causing the display apparatus 4 to display analysis support information has been issued (S6: YES), the display control unit 26D performs a process for combining and displaying an analysis support image including the two-dimensional scatter diagram generated by the display information generation unit 26C with the display image being displayed on the display apparatus 4 (step S7 in FIG. 3A). In the case of obtaining a determination result indicating that an instruction for causing the display apparatus 4 to display analysis support information has not been issued (S6: NO), the display control unit 26D skips the processes from step S7 in FIG. 3A and ends the series of processes.

Figure 7:
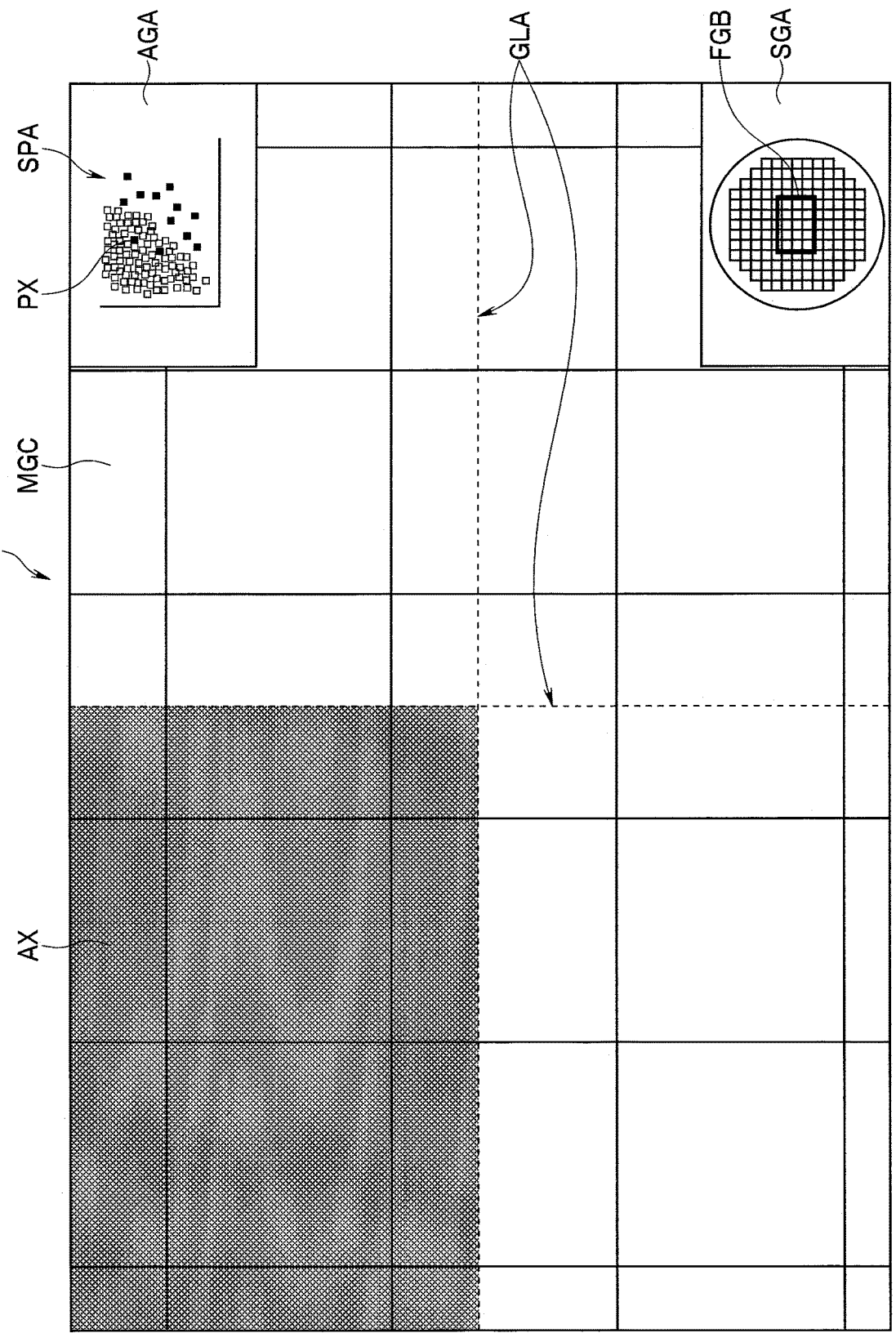
FIG. 7 is a diagram illustrating an example of a display image displayed according to the process by the image processing apparatus according to the first embodiment.

At this point, in the case where the process of step S7 in FIG. 3A is performed in the state in which the display image DGC is being displayed on the display apparatus 4, a display image DGD in which an analysis support image AGA is superimposed onto the display image DGC as illustrated in FIG. 7 is displayed on the display apparatus 4, for example. FIG. 7 is a diagram illustrating an example of a display image displayed according to the process by the image processing apparatus according to the first embodiment.

The analysis support image AGA includes a two-dimensional scatter diagram SPA containing S plot points. In the two-dimensional scatter diagram SPA, each plot point corresponding to a normal region is drawn as a white point, and each plot point corresponding to an abnormal region is drawn as a black point.

Note that according to the present embodiment, the normal regions included in the main image MGC and the plot points corresponding to the normal regions included in the two-dimensional scatter diagram SPA may be colored with similar colors. According to the present embodiment, the abnormal regions included in the main image MGC and the plot points corresponding to the abnormal regions included in the two-dimensional scatter diagram SPA may be colored with similar colors.

After performing the process of step S7 in FIG. 3A, the display control unit 26D performs a determination process on the basis of the information acquired by the information acquisition unit 26A regarding whether or not an instruction for selecting a desired position in the main image as the selected position has been issued through the input I/F 3 (step S8 in FIG. 3B).

In the case of obtaining a determination result indicating that an instruction for selecting a desired position in the main image as the selected position has not been issued (S8: NO), the display control unit 26D proceeds to the process of step S10 in FIG. 3B described later. In the case of obtaining a determination result indicating that an instruction for selecting a desired position in the main image as the selected position has been issued (S8: YES), the display control unit 26D performs a process related to discriminative display causing a selected region that contains the selected position in the main image and the plot points corresponding to the selected region contained in the two-dimensional scatter diagram being displayed together with the main image to be visually identifiable (step S9 in FIG. 3B), and then ends the series of processes.

Figure 8:
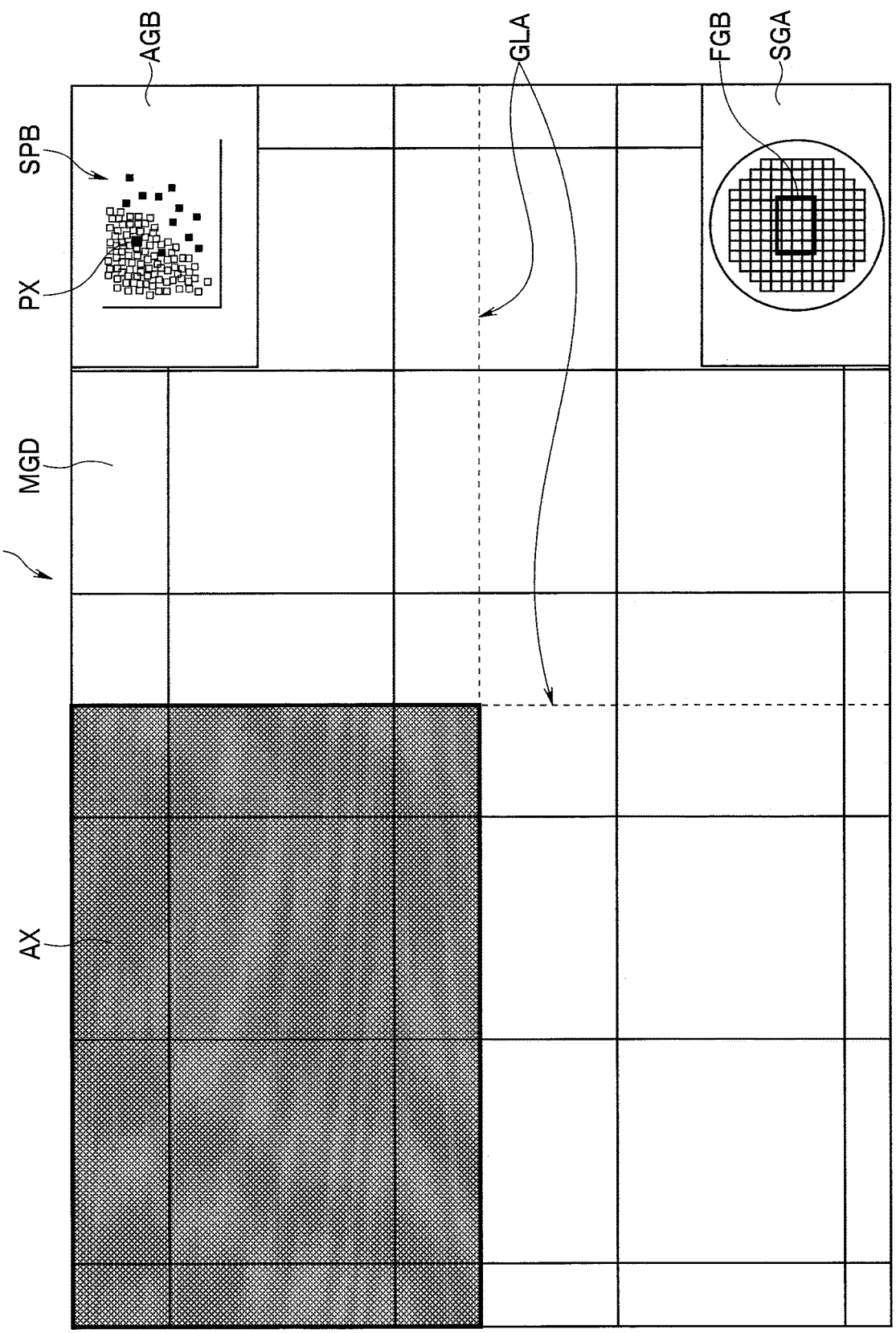
FIG. 8 is a diagram illustrating an example of a display image displayed according to the process by the image processing apparatus according to the first embodiment.
Figure 9:
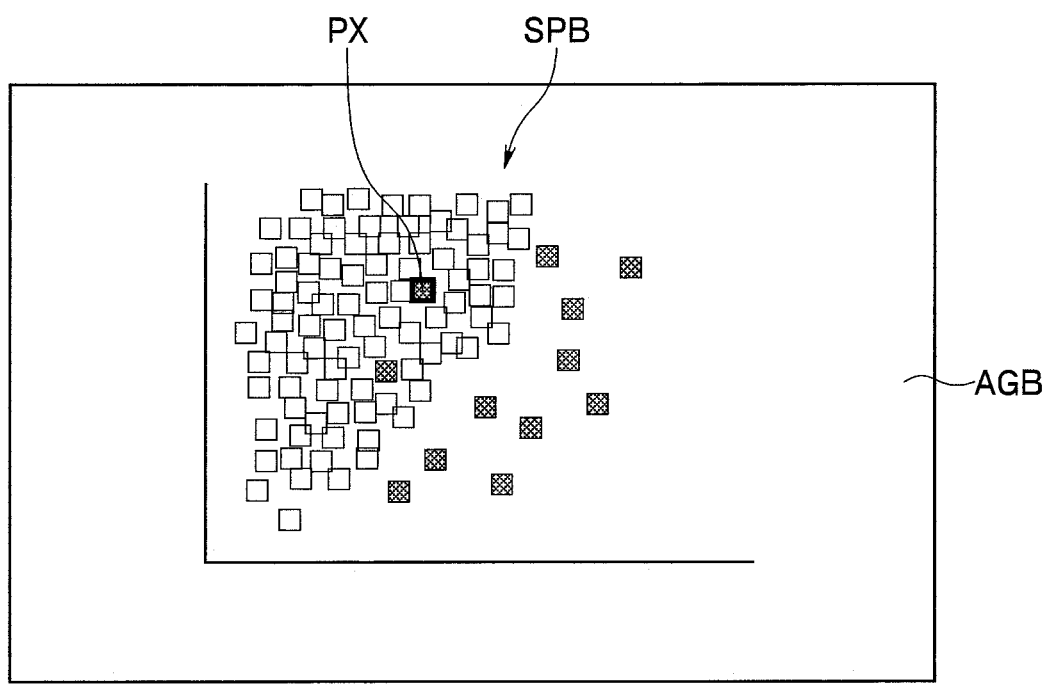
FIG. 9 is a diagram for explaining a two-dimensional scatter diagram included in an analysis support image of the display image in FIG. 8.

Specifically, for example, in the case where any position inside the region AX in the main image MGC in FIG. 7 is selected as the selected position, a process related to discriminative display is performed to cause the region AX and a plot point PX corresponding to the region AX contained in the two-dimensional scatter diagram SPA being displayed together with the main image MGC to be visually identifiable. According to such a process, a border is displayed around the region AX in a main image MGD being displayed in a display image DGE and also around the plot point PX in a two-dimensional scatter diagram SPB included in an analysis support image AGB being displayed in the display image DGE, as illustrated in FIGS. 8 and 9, for example. Note that in the two-dimensional scatter diagram SPB in FIG. 9, a hatching pattern similar to FIG. 7 is applied to each plot point corresponding to the abnormal region for convenience. FIG. 8 is a diagram illustrating an example of a display image displayed according to the process by the image processing apparatus according to the first embodiment. FIG. 9 is a diagram for explaining a two-dimensional scatter diagram included in the analysis support image of the display image in FIG. 8.

The display control unit 26D performs a determination process on the basis of the information acquired by the information acquisition unit 26A regarding whether or not an instruction for selecting a desired plot point as the selected point from among the plot points contained in the two-dimensional scatter diagram being displayed together with the main image has been issued through the input I/F 3 (step S10 in FIG. 3B).

In the case of obtaining a determination result indicating that an instruction for selecting a desired plot point as the selected point from among the plot points contained in the two-dimensional scatter diagram being displayed together with the main image has not been issued (S10: NO), the display control unit 26D ends the series of processes. In the case of obtaining a determination result indicating that an instruction for selecting a desired plot point as the selected point from among the plot points contained in the two-dimensional scatter diagram being displayed together with the main image has been issued (S10: YES), the display control unit 26D performs a process related to discriminative display causing the selected point and the region corresponding to the selected point in the main image to be visually identifiable (step S11 in FIG. 3B), and then ends the series of processes.

Specifically, for example, in the case where the plot point PX in the two-dimensional scatter diagram SPA in FIG. 7 is selected as the selected point, a process related to discriminative display is performed to cause the plot point PX and the region AX corresponding to the plot point PX in the main image MGC to be visually identifiable. According to such a process, a border is displayed around the plot point PX in the two-dimensional scatter diagram SPB included in the analysis support image AGB being displayed in the display DGE and also around the region AX in the main image MGD being displayed in the display image DGE, as illustrated in FIGS. 8 and 9, for example.

Note that in step S9 and/or step S11 in FIG. 3B, the display control unit 26D of the present embodiment may also perform a process of lowering the brightness of each region other than the region AX in the main image MGC, for example. In step S9 in FIG. 3, the display control unit 26D may also perform a process for enlarging the display of the region AX in the main image MGC, for example.

As described above, according to the present embodiment, an area having a low likelihood of the classification result of classifying a plurality of regions set in the image into one of a plurality of predetermined classes can be discovered with a two-dimensional scatter diagram, and a plot point corresponding to the area in the two-dimensional scatter diagram and the region corresponding to the area in the main image being displayed together with the two-dimensional scatter diagram can be spotted easily, for example. Consequently, according to the present embodiment, the work efficiency can be improved for the work of specifying areas in the image where close inspection is necessary.

Note that according to the present embodiment, in the case where an instruction for correcting a classification result displayed as a plurality of plot points in the two-dimensional scatter image or as visual information in the main image is issued through the input I/F 3, classification information corresponding to the corrected classification result corrected according to the instruction may be stored in the processing result storage unit 25, for example.

According to the present embodiment, a process for converting multidimensional data acquired by the multidimensional data acquisition unit 24A into one-dimensional data may be performed in the low-dimensional data conversion unit 24B, and a process for generating a plotted diagram in which the one-dimensional data is plotted as coordinates on a line may be performed by the display information generation unit 26C.

According to the present embodiment, a process for converting multidimensional data acquired by the multidimensional data acquisition unit 24A into three-dimensional data may be performed in the low-dimensional data conversion unit 24B, and a process for generating a plotted diagram in which the three-dimensional data is plotted as coordinates in a spatial coordinate system may be performed by the display information generation unit 26C.

According to the present embodiment, the display information generation unit 26C may also be configured to perform a process for generating a plotted diagram different from the two-dimensional scatter diagram using the S pieces of two-dimensional data included in the information read from the processing result storage unit 25.

Second Embodiment

FIGS. 10 to 15B relate to a second embodiment.

Note that in the present embodiment, a detailed description of portions having a configuration and the like that are similar to the first embodiment will be omitted, and the portions having a configuration and the like that are different from the first embodiment will be described mainly.

An image processing system 101 according to the present embodiment includes an image processing apparatus 2A as illustrated in FIG. 10 instead of the image processing apparatus 2 illustrated in FIG. 2. FIG. 10 is a diagram illustrating an example of a configuration of an image processing apparatus according to the second embodiment.

The image processing apparatus 2A is configured as a computer including one or more processors 201 and a storage medium 202 (not illustrated), for example. In addition, the image processing apparatus 2A is configured to generate a display image by processing the image outputted from the image pickup apparatus 1, and also output the generated display image to the display apparatus 4. The image processing apparatus 2A is configured to detect an instruction outputted from the input I/F 3, generate information such as the display image according to the detected instruction, and output the generated information to the display apparatus 4.

For example, as illustrated in FIG. 10, the image processing apparatus 2A includes a preprocessing unit 21, an image recording unit 22, an inference processing unit 33, a dimensionality conversion processing unit 34, and a display processing unit 36.

The inference processing unit 33 is configured to set T (where T 2) regions in the main image outputted from the display processing unit 36.

Note that in the present embodiment, it is sufficient to set the value of T, which corresponds to the number of regions to be processed by the inference processing unit 33 and the dimensionality conversion processing unit 34, to a sufficiently small value compared to the value of S, which corresponds to the number of regions to be processed by the inference processing unit 23 and the dimensionality conversion processing unit 24 in the first embodiment. In the present embodiment, the T regions set by the process by the inference processing unit 33 and the dimensionality conversion processing unit 34 are described as being rectangular regions. In the present embodiment, the methods of setting the T regions by the inference processing unit 33 and the dimensionality conversion processing unit 34 are described as being the same.

The inference processing unit 33 is configured to perform, on each of the T regions set in the main image outputted from the display processing unit 36, a process for acquiring classification information that corresponds to information indicating a classification result of classifying each region into one of a plurality of predetermined classes, and a process for acquiring likelihood information that corresponds to information indicating a result of calculating the likelihood of the classification result. The inference processing unit 33 is configured to output the classification information and the likelihood information obtained by the above process to the display processing unit 36. Specifically, for example, the inference processing unit 33 is configured to use a multilayer neural network similar to the inference processing unit 23 of the first embodiment as a type of statistical model constructed through machine learning.

In other words, the inference processing unit 33 is configured to perform a process for acquiring a classification result of classifying each of the plurality of regions set in the main image (processing target image) outputted from the display processing unit 36 into one of a plurality of predetermined classes, and a process for calculating the likelihood of the classification result in each of the plurality of regions.

The dimensionality conversion processing unit 34 includes a multidimensional data acquisition unit 34A and a low-dimensional data conversion unit 34B.

The multidimensional data acquisition unit 34A is configured to set T regions in the main image outputted from the display processing unit 36.

The multidimensional data acquisition unit 34A is configured to perform a process for acquiring multidimensional data corresponding to each of the T regions set in the main image outputted from the display processing unit 36. Specifically, for example, the multidimensional data acquisition unit 34A is configured to perform a process for acquiring a pixel value of each pixel included in one of the T regions for each of the T regions set in the main image outputted from the display processing unit 36. As another example, the multidimensional data acquisition unit 34A is configured to perform a process for calculating a feature vector corresponding to a pixel value of each pixel included in one of the T regions for each of the T regions set in the main image outputted from the display processing unit 36.

The low-dimensional data conversion unit 34B is configured to perform a process for converting the multidimensional data obtained as a processing result from the multidimensional data acquisition unit 34A into low-dimensional data. Specifically, for example, the low-dimensional data conversion unit 34B is configured to perform a process for converting each pixel value acquired from one of the T regions into two-dimensional data for each of the T regions set in the main image outputted from the display processing unit 36. As another example, the low-dimensional data conversion unit 34B is configured to perform a process for converting a feature vector calculated in one of the T regions into two-dimensional data for each of the T regions set in the main image outputted from the display processing unit 36.

The low-dimensional data conversion unit 34B is configured to output the two-dimensional data obtained by the above process to the display processing unit 36.

In other words, the dimensionality conversion processing unit 34 is configured to perform a process for acquiring multidimensional data corresponding to each of a plurality of regions set in the main image (processing target image) outputted from the display processing unit 36, and also perform a process for converting the multidimensional data into low-dimensional data.

The display processing unit 36 includes an information acquisition unit 36A, a display image generation unit 36B, a display information generation unit 36C, and a display control unit 36D.

The information acquisition unit 36A is configured to detect an instruction issued through the input I/F 3, and also perform a process for acquiring information to be used in processes by the display image generation unit 36B, the display information generation unit 36C, and the display control unit 36D on the basis of the detected instruction. Specifically, on the basis of the result of detecting an instruction issued through the input I/F 3, the information acquisition unit 36A is configured to perform a process for acquiring each of information indicating the magnification of the main image displayed on the display apparatus 4, information indicating the position of interest set in the main image, information indicating a selected position selected in the main image, and information indicating a selected point selected from among plot points contained in a two-dimensional scatter diagram displayed on the display apparatus 4 together with the main image.

The display image generation unit 36B is configured to use at least one of the P images recorded to the image recording unit 22 to generate a main image according to the magnification and the position of interest included in the information acquired by the information acquisition unit 36A. In other words, in the main image generated by the display image generation unit 36B, the position of interest included in the information acquired by the information acquisition unit 36A is aligned with the center of the display screen, and the main image is displayed on the display apparatus 4 as an image at the magnification included in the information. The display image generation unit 36B is configured to output the main image generated as above to the inference processing unit 33 and the dimensionality conversion processing unit 34. The display image generation unit 36B is configured to generate a sub-image by reducing the image GRN, for example. The display image generation unit 36B is configured to generate a display image by superimposing the sub-image onto a predetermined region in the main image. The display image generation unit 36B is configured to specify the display range of the main image being displayed on the display apparatus 4 out of the image GRN on the basis of the magnification and the position of interest included in the information acquired by the information acquisition unit 36A, and also superimpose a rectangular frame indicating the specified display range onto the sub-image.

The display information generation unit 36C is configured to generate display information according to the inference result outputted from the inference processing unit 33 and the two-dimensional data outputted from the dimensionality conversion processing unit 34. Specifically, the display information generation unit 36C is configured to generate a two-dimensional scatter diagram in which the T pieces of two-dimensional data outputted from the dimensionality conversion processing unit 34 are plotted as coordinates in a planar coordinate system. The display information generation unit 36C is configured to apply different colors or patterns according to the classification information outputted from the inference processing unit 33 to each of the T plot points contained in the two-dimensional scatter diagram generated as described above. The display information generation unit 36C is configured to generate visual information for visually indicating the classification information and the likelihood information corresponding to an inference result outputted from the inference processing unit 33 in the main image generated by the display image generation unit 36B.

The display control unit 36D is configured to perform a process for causing the display apparatus 4 to display the display image generated by the display image generation unit 36B. In a case of detecting that an instruction for causing the display apparatus 4 to display analysis support information corresponding to information for supporting the analysis of the main image by the user has been issued through the input I/F 3, the display control unit 36D is configured to perform a process for combining and displaying an analysis support image including the two-dimensional scatter diagram generated by the display information generation unit 36C with the display image being displayed on the display apparatus 4. In a case of detecting that an instruction for causing the display apparatus 4 to display an inference result obtained by the inference processing unit 33 has been issued through the input I/F 3, the display control unit 36D is configured to perform a process for combining and displaying visual information generated by the display information generation unit 36C with the display image (main image) being displayed on the display apparatus 4. The display control unit 36D is configured to perform a process (described later) for changing the display mode of the main image and the two-dimensional scatter diagram being displayed on the display apparatus 4 according to the selected position included in the information acquired by the information acquisition unit 36A. The display control unit 36D is configured to perform a process (described later) for changing the display mode of the main image and the two-dimensional scatter diagram being displayed on the display apparatus 4 according to the selected point included in the information acquired by the information acquisition unit 36A.

In other words, the display processing unit 36 is configured to perform a process for causing the display apparatus 4 to display the display image (main image) including the T regions set in the main image together with the plotted diagram (two-dimensional scatter diagram) containing a plurality of plot points generated by applying different colors or patterns according to the classification result obtained by the inference processing unit 33 to the low-dimensional data (two-dimensional data) in each of the T regions. The display processing unit 36 is configured to perform a process for generating a two-dimensional scatter diagram including a plurality of plot points generated by applying colors or patterns according to the classification result obtained by the inference processing unit 33 to the two-dimensional data in each of the T regions set in the main image. The display processing unit 36 is configured to perform a process for causing the display apparatus 4 to combine and display visual information according to the classification result and the likelihood obtained by the inference processing unit 33 with the display image (main image).

Note that in the present embodiment, the function of each unit of the image processing apparatus 2A may also be achieved by hardware including a processor 201 and a storage medium 202. As an alternative example, in the present embodiment, a program for achieving the function of each unit of the image processing apparatus 2A may be stored in the storage medium 202, and the processor 201 may read and execute the program. Examples of the computer-readable storage medium 202 include an optical disc such as CD-ROM, a phase change optical disc such as DVD-ROM, a magneto-optical (MO) disc such as MiniDisc (MD), a magnetic disk such as a floppy (registered trademark) disk or a removable hard disk, or a memory card such as CompactFlash (registered trademark), SmartMedia, SD memory card, or Memory Stick. A hardware device such as an integrated circuit (such as an IC chip) specially designed and configured for the object of the present invention may also be included as the storage medium.

Figure 11A:
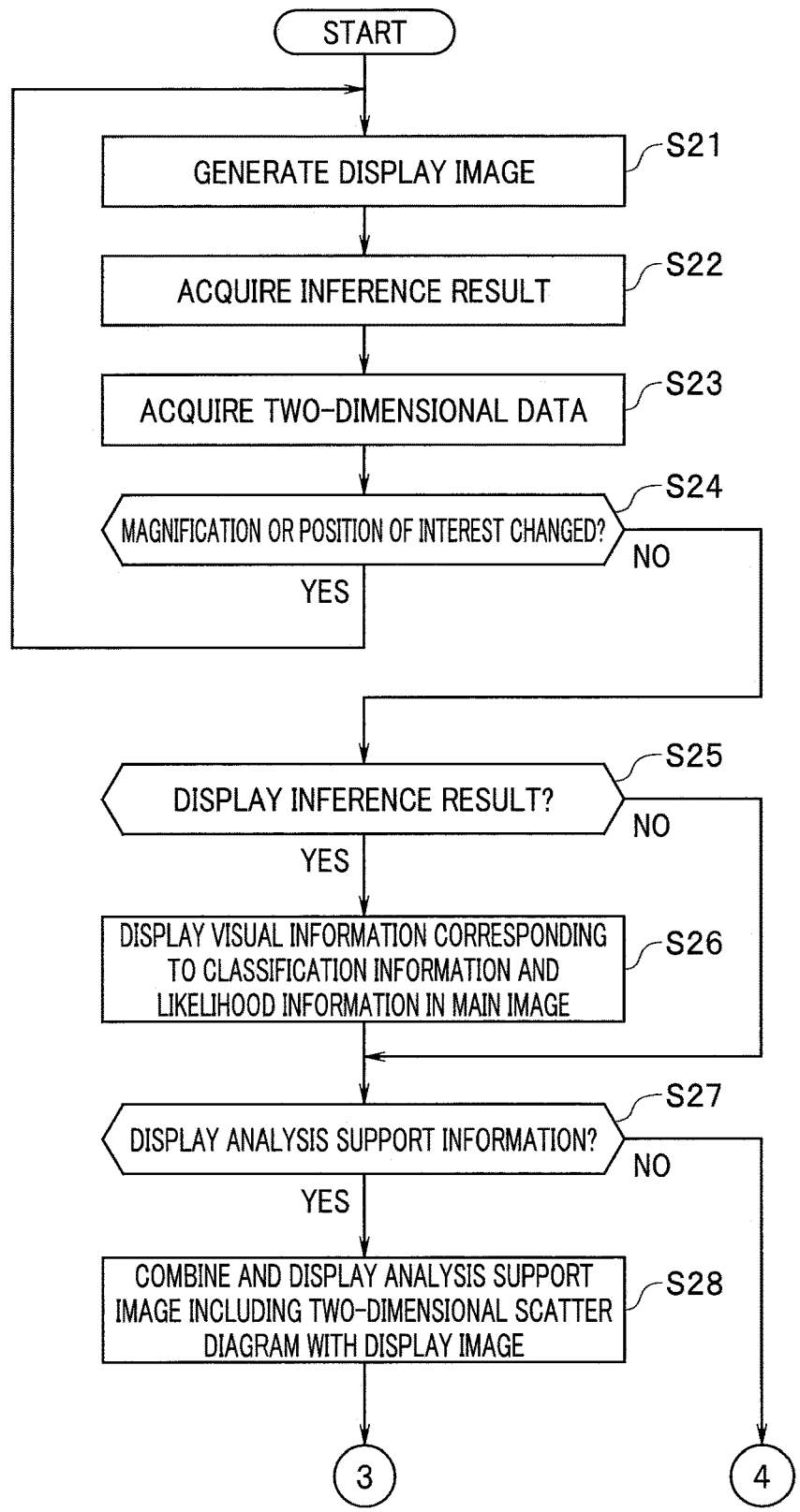
FIG. 11A is a flowchart illustrating a portion of a specific example of a process performed in the image processing apparatus according to the second embodiment.
Figure 11B:
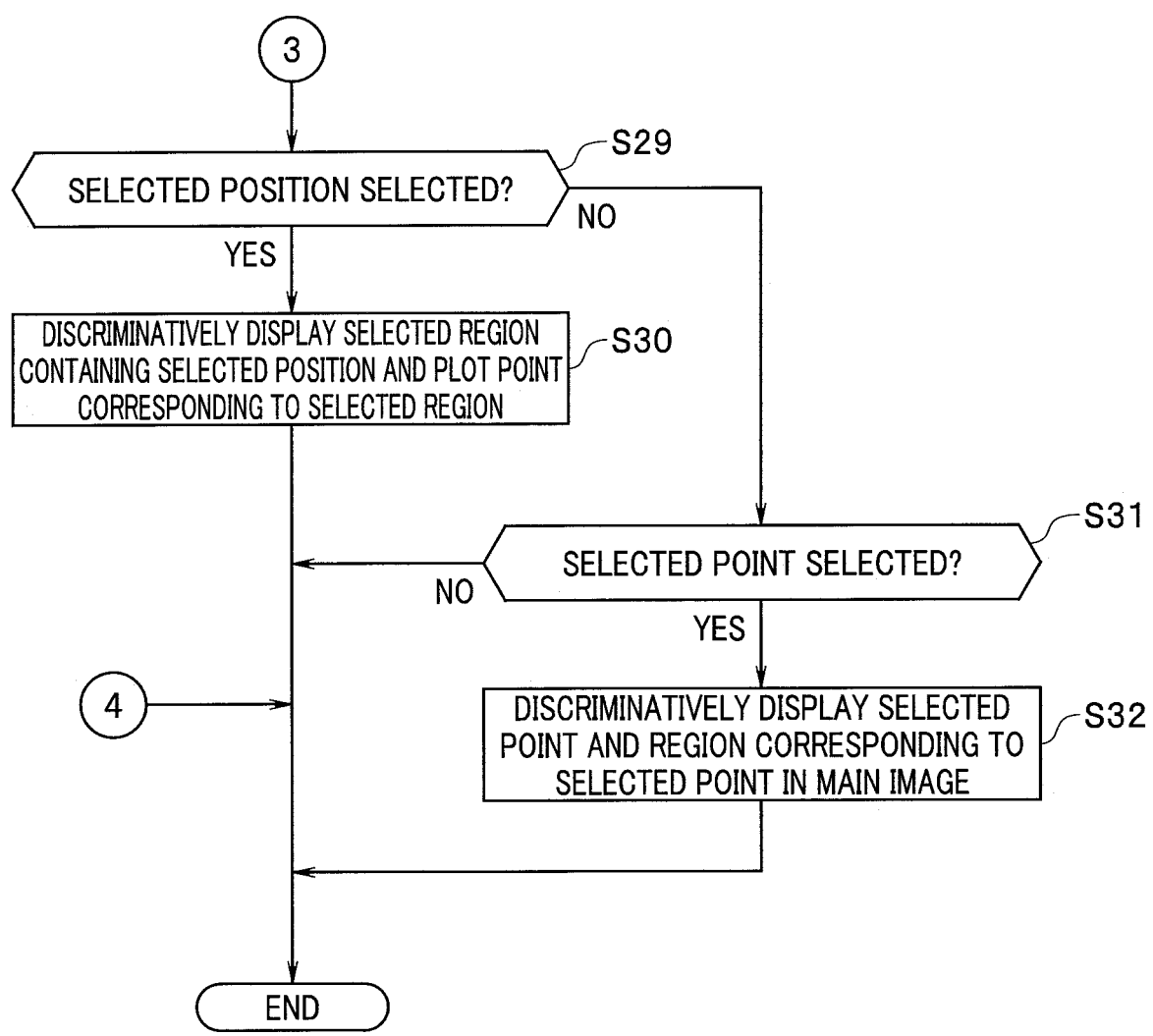
FIG. 11B is a flowchart illustrating a continuation of the process in FIG. 11A.

Next, the action of the present embodiment will be described with reference to diagrams such as FIGS. 11A and 11B. FIG. 11A is a flowchart illustrating a portion of a specific example of a process performed in the image processing apparatus according to the second embodiment. FIG. 11B is a flowchart illustrating a continuation of the process in FIG. 11A.

The display image generation unit 36B performs a process for generating a display image including a main image and a sub-image using at least one of the P images recorded to the image recording unit 22 on the basis of the magnification and the position of interest included in the information acquired by the information acquisition unit 36A (step S21 in FIG. 11A). The display image generation unit 36B outputs the main image included in the display image generated in step S21 in FIG. 11A to the inference processing unit 33 and the dimensionality conversion processing unit 34.

Specifically, for example, in a default state corresponding to the state in which an instruction related to setting the magnification and the position of interest has not been issued, the display image generation unit 36B generates a display image DGA including a main image MGA and a sub-image SGA as illustrated in FIG. 4. The display image generation unit 36B outputs the main image MGA included in the display image DGA to the inference processing unit 33 and the dimensionality conversion processing unit 34.

The inference processing unit 33 sets T regions in the main image outputted from the display processing unit 36 via step S21 in FIG. 11A. The inference processing unit 33 performs a process for acquiring the classification information indicating the classification result of classifying each of the T regions set in the above main image into one of a plurality of predetermined classes and the likelihood information indicating the result of calculating the likelihood of the classification result in each of the T regions as an inference result (step S22 in FIG. 11A). The inference processing unit 33 outputs the inference result (classification information and likelihood information) acquired in step S22 in FIG. 11A to the display processing unit 36.

Note that in the present embodiment, a process for acquiring classification information indicating a classification result of classifying each of the T regions set in the main image outputted by the display processing unit 36 into one of the two classes "normal" and "abnormal" is described as being performed by the inference processing unit 33. In the present embodiment, a process for acquiring likelihood information indicating the result of calculating the likelihood of the classification result in each normal region and the result of calculating the likelihood of the classification result in each abnormal region is described as being performed by the inference processing unit 33.

The dimensionality conversion processing unit 34 (multidimensional data acquisition unit 34A) sets T regions in the main image outputted from the display processing unit 36 via step S21 in FIG. 11A. The dimensionality conversion processing unit 34 (multidimensional data acquisition unit 34A and low-dimensional data conversion unit 34B) performs a process for acquiring multidimensional data corresponding to each of the T regions set in the above main image, and also performs a process for converting the multidimensional data to acquire two-dimensional data (step S23 in FIG. 11A). The dimensionality conversion processing unit 34 (low-dimensional data conversion unit 34B) outputs the two-dimensional data acquired in step S23 in FIG. 11A to the display processing unit 36.

The display image generation unit 36B performs a determination process regarding whether or not the magnification or the position of interest included in the information acquired by the information acquisition unit 36A has changed from the state of step S21 in FIG. 11A (step S24 in FIG. 11A).

In the case of obtaining a determination result indicating that the magnification or the position of interest included in the information acquired by the information acquisition unit 36A has changed from the state in step S21 in FIG. 11A (S24: YES), the display image generation unit 36B returns to and performs the process of step S21 in FIG. 11A, thereby generating a display image according to the changed magnification and the position of interest, and also outputting the main image included in the generated display image to the inference processing unit 33 and the dimensionality conversion processing unit 34.

Specifically, for example, in the case where the magnification or the position of interest is changed from the state in which the display image DGA in FIG. 4 is being displayed on the display apparatus 4, the display image generation unit 36B generates a display image DGB including a main image MGB and a sub-image SGA as illustrated in FIG. 5. The display image generation unit 36B outputs the main image MGB included in the display image DGB to the inference processing unit 33 and the dimensionality conversion processing unit 34.

According to the process described above, every time the magnification or the position of interest in the main image is changed, the process of setting T regions in the main image, the process for acquiring a classification result of classifying each of the T regions into one of a plurality of predetermined classes, and the process for calculating the likelihood of the classification result in each of the T regions are performed by the inference processing unit 33. According to the process described above, every time the magnification or the position of interest in the main image is changed, the process of setting T regions in the main image, the process for acquiring multidimensional data corresponding to each of the T regions, and the process for converting the multidimensional data to acquire two-dimensional data are performed by the dimensionality conversion processing unit 34.

In the case of detecting that a determination result indicating that neither the magnification nor the position of interest included in the information acquired by the information acquisition unit 36A has changed from the state of step S21 in FIG. 11A has been obtained (S24: NO), the display control unit 36D performs a determination process regarding whether or not an instruction for causing the display apparatus 4 to display an inference result obtained by the inference processing unit 33 has been issued through the input I/F 3 (step S25 in FIG. 11A).

In the case of obtaining a determination result indicating that an instruction for causing the display apparatus 4 to display the inference result obtained by the inference processing unit 33 has been issued (S25: YES), the display control unit 36D performs a process for combining and displaying visual information generated by the display information generation unit 36C with the display image being displayed on the display apparatus 4 (step S26 in FIG. 11A). In the case of obtaining a determination result indicating that an instruction for causing the display apparatus 4 to display the inference result obtained by the inference processing unit 33 has not been issued (S25: NO), the process of step S26 in FIG. 11A is skipped and the process of step S27 is performed.

At this point, in the case where the process of step S26 in FIG. 11A is performed in the state in which the display image DGA in FIG. 4 is being displayed on the display apparatus 4, a display image DGK including a main image MGK and the sub-image SGA as illustrated in FIG. 12A is displayed on the display apparatus 4, for example. FIG. 12A is a diagram illustrating an example of a display image displayed according to the process by the image processing apparatus according to the second embodiment.

In the main image MGK, grid lines GLK indicating the set state of the T regions are drawn with dashed lines.

In the main image MGK, the inference result corresponding to each of the T regions is illustrated.

Specifically, for example, of the 16 regions divided by the grid lines GLK in the main image MGK, two regions including a region AY superimposed with a hatching pattern are illustrated as abnormal regions, and 14 regions not superimposed with the hatching pattern are illustrated as normal regions.

In the case where the process of step S26 in FIG. 11A is performed in the state in which the display image DGB in FIG. 5 is being displayed on the display apparatus 4, a display image DGP including a main image MGP and the sub-image SGA as illustrated in FIG. 12B is displayed on the display apparatus 4, for example. FIG. 12B is a diagram illustrating an example of a display image displayed according to the process by the image processing apparatus according to the second embodiment.

In the main image MGP, grid lines GLP indicating the set state of the T regions are drawn with dashed lines.

In the main image MGP, the inference result corresponding to each of the T regions is illustrated.

Specifically, for example, of the 16 regions divided by the grid lines GLP in the main image MGP, three regions including a region AZ superimposed with a hatching pattern are illustrated as abnormal regions, and 13 regions not superimposed with the hatching pattern are illustrated as normal regions.

After the process of step S25 or step S26 in FIG. 11A is performed, the display control unit 36D performs a determination process regarding whether or not an instruction for causing the display apparatus 4 to display analysis support information has been issued through the input I/F 3 (step S27 in FIG. 11A).

In the case where a determination result indicating that an instruction for causing the display apparatus 4 to display analysis support information has been issued (S27: YES), the display control unit 36D performs a process for combining and displaying an analysis support image including the two-dimensional scatter diagram generated by the display information generation unit 36C with the display image being displayed on the display apparatus 4 (step S28 in FIG. 11A). In the case of obtaining a determination result indicating that an instruction for causing the display apparatus 4 to display analysis support information has not been issued (S27: NO), the display control unit 36D skips the processes from step S28 in FIG. 11A and ends the series of processes.

At this point, in the case where the process of step S28 in FIG. 11A is performed in the state in which the display image DGK in FIG. 12A is being displayed on the display apparatus 4, a display image DGL in which an analysis support image AGK is superimposed onto the display image DGK as illustrated in FIG. 13A is displayed on the display apparatus 4, for example. FIG. 13A is a diagram illustrating an example of a display image displayed according to the process by the image processing apparatus according to the second embodiment.

The analysis support image AGK includes a two-dimensional scatter diagram SPK containing T plot points. In the two-dimensional scatter diagram SPK, each plot point corresponding to a normal region is drawn as a white point, and each plot point corresponding to an abnormal region is drawn as a black point.

Figure 13B:
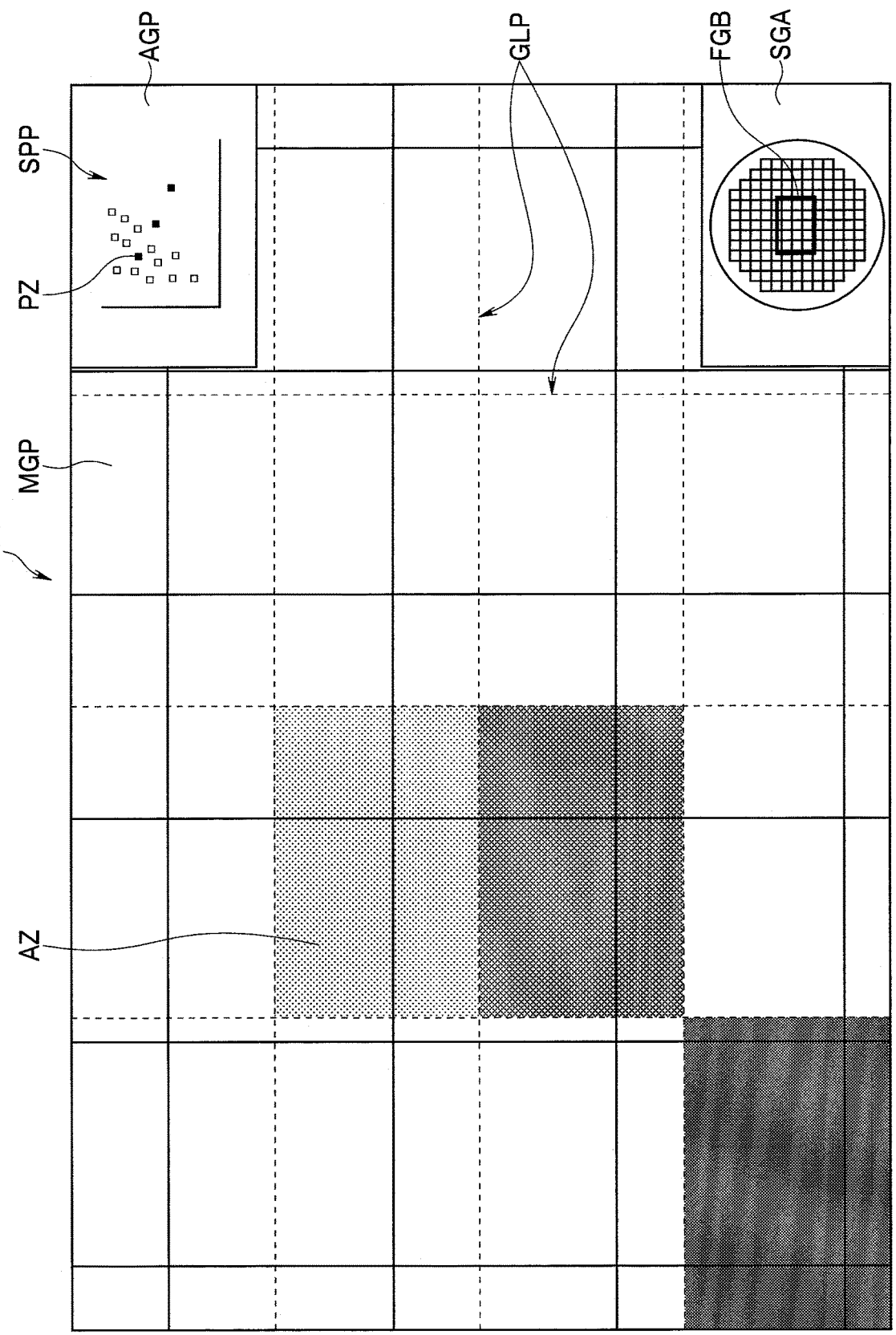
FIG. 13B is a diagram illustrating an example of a display image displayed according to the process by the image processing apparatus according to the second embodiment.

In the case where the process of step S28 in FIG. 11A is performed in the state in which the display image DGP in FIG. 12B is being displayed on the display apparatus 4, a display image DGQ in which an analysis support image AGP is superimposed onto the display image DGP as illustrated in FIG. 13B is displayed on the display apparatus 4, for example. FIG. 13B is a diagram illustrating an example of a display image displayed according to the process by the image processing apparatus according to the second embodiment.

The analysis support image AGP includes a two-dimensional scatter diagram SPP containing T plot points. In the two-dimensional scatter diagram SPP, each plot point corresponding to a normal region is drawn as a white point, and each plot point corresponding to an abnormal region is drawn as a black point.

In other words, according to the processes as described above, the display content of the inference result displayed in the main image and the display content of the two-dimensional scatter diagram displayed together with the main image can be varied dynamically according to the magnification and the position of interest set in the main image.

After performing the process of step S28 in FIG. 11A, the display control unit 36D performs a determination process on the basis of the information acquired by the information acquisition unit 36A regarding whether or not an instruction for selecting a desired position in the main image as the selected position has been issued through the input I/F 3 (step S29 in FIG. 11B).

In the case of obtaining a determination result indicating that an instruction for selecting a desired position in the main image as the selected position has not been issued (S29: NO), the display control unit 36D proceeds to the process of step S31 in FIG. 11B described later. In the case of obtaining a determination result indicating that an instruction for selecting a desired position in the main image as the selected position has been issued (S29: YES), the display control unit 36D performs a process related to discriminative display causing a selected region that contains the selected position in the main image and the plot points corresponding to the selected region contained in the two-dimensional scatter diagram being displayed together with the main image to be visually identifiable (step S30 in FIG. 11B), and then ends the series of processes.

Figure 15A:
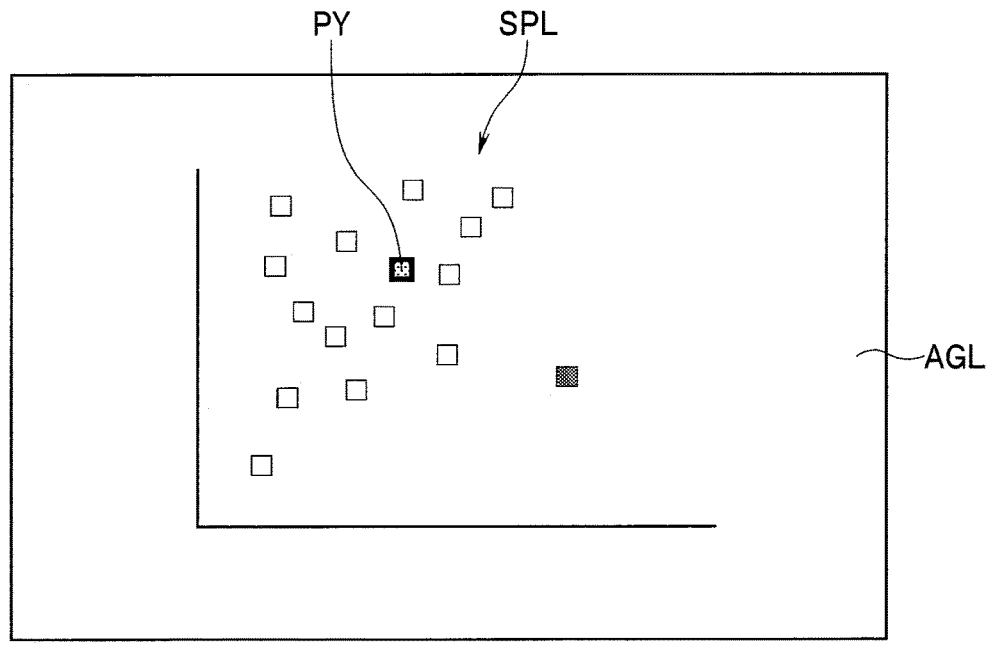
FIG. 15A is a diagram for explaining a two-dimensional scatter diagram included in an analysis support image of the display image in FIG. 14A.

Specifically, for example, in the case where any position inside the region AY in the main image MGK in FIG. 13A is selected as the selected position, a process related to discriminative display is performed to cause the region AY and a plot point PY corresponding to the region AY contained in the two-dimensional scatter diagram SPK being displayed together with the main image MGK to be visually identifiable. According to such a process, a border is displayed around the region AY in a main image MGL being displayed in a display image DGM and also around the plot point PY in a two-dimensional scatter diagram SPL included in an analysis support image AGL being displayed in the display image DGM, as illustrated in FIGS. 14A and 15A, for example. Note that in the two-dimensional scatter diagram SPL in FIG. 15A, a hatching pattern similar to FIG. 13A is applied to each plot point corresponding to the abnormal region for convenience. FIG. 14A is a diagram illustrating an example of a display image displayed according to the process by the image processing apparatus according to the second embodiment. FIG. 15A is a diagram for explaining a two-dimensional scatter diagram included in an analysis support image of the display image in FIG. 14A.

Figure 15B:
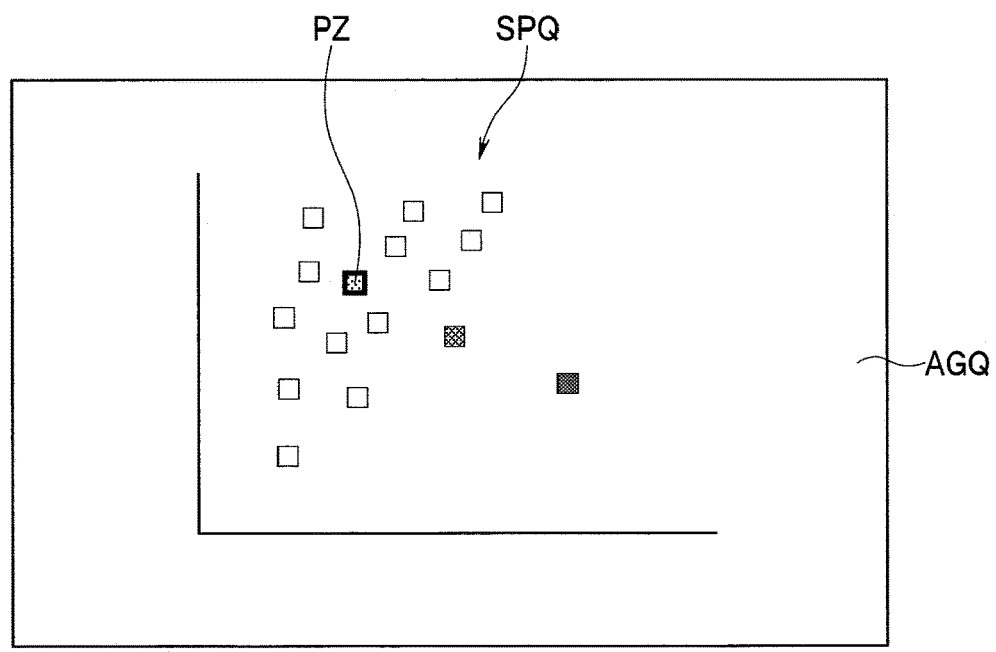
FIG. 15B is a diagram for explaining a two-dimensional scatter diagram included in an analysis support image of the display image in FIG. 14B.

For example, in the case where any position inside the region AZ in the main image MGP in FIG. 13B is selected as the selected position, a process related to discriminative display is performed to cause the region AZ and a plot point PZ corresponding to the region AZ contained in the two-dimensional scatter diagram SPP being displayed together with the main image MGP to be visually identifiable. According to such a process, a border is displayed around the region AZ in a main image MGQ being displayed in a display image DGR and also around the plot point PZ in a two-dimensional scatter diagram SPQ included in an analysis support image AGQ being displayed in the display image DGR, as illustrated in FIGS. 14B and 15B, for example. Note that in the two-dimensional scatter diagram SPQ in FIG. 15B, a hatching pattern similar to FIG. 13B is applied to each plot point corresponding to the abnormal region for convenience. FIG. 14B is a diagram illustrating an example of a display image displayed according to the process by the image processing apparatus according to the second embodiment. FIG. 15B is a diagram for explaining a two-dimensional scatter diagram included in an analysis support image of the display image in FIG. 14B.

The display control unit 36D performs a determination process on the basis of the information acquired by the information acquisition unit 36A regarding whether or not an instruction for selecting a desired plot point as the selected point from among the plot points contained in the two-dimensional scatter diagram being displayed together with the main image has been issued through the input I/F 3 (step S31 in FIG. 11B).

In the case of obtaining a determination result indicating that an instruction for selecting a desired plot point as the selected point from among the plot points contained in the two-dimensional scatter diagram being displayed together with the main image has not been issued (S31: NO), the display control unit 36D ends the series of processes. In the case of obtaining a determination result indicating that an instruction for selecting a desired plot point as the selected point from among the plot points contained in the two-dimensional scatter diagram being displayed together with the main image has been issued (S31: YES), the display control unit 36D performs a process related to discriminative display causing the selected point and the region corresponding to the selected point in the main image to be visually identifiable (step S32 in FIG. 11B), and then ends the series of processes.

Specifically, for example, in the case where the plot point PY in the two-dimensional scatter diagram SPK in FIG. 13A is selected as the selected point, a process related to discriminative display is performed to cause the plot point PY and the region AY corresponding to the plot point PY in the main image MGK to be visually identifiable. According to such a process, a border is displayed around the plot point PY in the two-dimensional scatter diagram SPL included in the analysis support image AGL being displayed in the display image DGM and also around the region AY in the main image MGL being displayed in the display image DGM, as illustrated in FIGS. 14A and 15A, for example.

In the case where the plot point PZ in the two-dimensional scatter diagram SPP in FIG. 13B is selected as the selected point, a process related to discriminative display is performed to cause the plot point PZ and the region AZ corresponding to the plot point PZ in the main image MGQ to be visually identifiable. According to such a process, a border is displayed around the plot point PZ in the two-dimensional scatter diagram SPQ included in the analysis support image AGQ being displayed in the display image DGR and also around the region AZ in the main image MGQ being displayed in the display image DGR, as illustrated in FIGS. 14B and 15B, for example.

Note that in the present embodiment, the inference processing unit 33 and the dimensionality conversion processing unit 34 may also set U regions having the same shape and size of the T regions set in the main image outputted from the display control unit 36D around the T regions, for example.

According to the configuration described above, in step S22 in FIG. 11A, a process for acquiring classification information indicating the classification result of classifying each of the (T+U) regions into one of a plurality of predetermined classes and likelihood information indicating the result of calculating the likelihood of the classification result in each of the (T+U) regions is performed by the inference processing unit 33, for example. According to the configuration described above, in step S23 in FIG. 11A, a process for acquiring multidimensional data corresponding to each of the (T+U) regions and also converting the multidimensional data to acquire two-dimensional data is performed by the dimensionality conversion processing unit 34, for example. Consequently, according to the configuration described above, the frequency of the processes by the inference processing unit 33 and the dimensionality conversion processing unit 34 performed in response to changes in the position of interest in the main image can be reduced, for example.

As described above, according to the present embodiment, an area having a low likelihood of the classification result of classifying a plurality of regions set in the image into one of a plurality of predetermined classes can be discovered with a two-dimensional scatter diagram, and a plot point corresponding to the area in the two-dimensional scatter diagram and the region corresponding to the area in the main image being displayed together with the two-dimensional scatter diagram can be spotted easily, for example. Consequently, according to the present embodiment, the work efficiency can be improved for the work of specifying areas in the image where close inspection is necessary.

Note that each of the embodiments described above is not limited in application to images in the industrial field obtained by performing image pickup that treats a semiconductor wafer and a plurality of chips formed on the semiconductor wafer as the object, but is also applicable in substantially the same way to images in the medical field obtained by performing image pickup that treats biological tissue or the like as the object.

The foregoing describes embodiments of the present invention, but these embodiments are illustrated as examples and are not intended to limit the scope of the present invention. Specifically, for example, cases that are not configured to apply different colors or patterns according to the classification information included in the information read from the processing result storage unit 25 are also acceptable. The reason is that in some cases, a region of close features in the distribution of groups (clusters) in the inference result obtained by the inference processing unit 23 is understandable without applying colors or patterns. The dimensionality conversion processing unit 34 may also output a clustering result corresponding to unsupervised learning, and does not necessarily have to perform dimensionality conversion. The novel embodiments can be carried out in various other forms, and a variety of omissions, substitutions, and alterations are possible within a scope that does not depart from the gist of the invention. The embodiments and the modifications of the embodiments are included in the scope and gist of the invention, and are also included in the scope of the invention as described in the claims and equivalents of the claims.

What is claimed is:

1. An image processing apparatus comprising a processor including hardware, wherein
   the processor is configured to
   acquire a classification result of classifying each of a plurality of regions set in a processing target image into one of a plurality of predetermined classes,
   perform a process for acquiring multidimensional data corresponding to each of the plurality of regions set in the processing target image, and also perform a process for converting the multidimensional data into low-dimensional data, and
   perform a process for causing a display apparatus to display a display image including one or more of the plurality of regions with a plotted diagram including a plurality of plot points generated by applying different colors or patterns according to the classification result to the low-dimensional data in each of the plurality of regions, and in a case where an instruction for selecting a desired plot point as a selected point from among the plot points contained in the plotted diagram is issued, perform a process related to discriminative display causing the selected point and a region corresponding to the selected point in the display image to be visually identifiable.

2. The image processing apparatus according to claim 1, wherein
   in a case where an instruction for selecting a desired position in the display image as a selected position is issued, the processor is configured to perform a process related to discriminative display causing a selected region including the selected position from among the plurality of regions and a plot point corresponding to the selected region included in the plotted diagram to be visually identifiable.

3. The image processing apparatus according to claim 1, wherein
   the processor is configured to use a statistical model constructed through machine learning, and further perform a process for calculating the classification result in each of the plurality of regions on a basis of a likelihood calculated by the statistical model, and
   the processor is further configured to perform a process for combining and causing the display apparatus to display visual information corresponding to the classification result and the likelihood with the display image.

4. The image processing apparatus according to claim 3, wherein
   in a case where an instruction for correcting the classification result displayed as the plurality of plot points in the plotted diagram or as the visual information in the display image is issued, the processor is further configured to store a classification result after the correction.

5. The image processing apparatus according to claim 1, wherein
   the processor is configured to perform a process for converting the multidimensional data into two-dimensional data, and
   the processor is configured to perform a process for generating a two-dimensional scatter diagram including the plurality of plot points generated by applying colors or patterns according to the classification result to the two-dimensional data in each of the plurality of regions.

6. An image processing method comprising:
   performing a process for acquiring a classification result of classifying each of a plurality of regions set in a processing target image into one of a plurality of predetermined classes;
   performing a process for acquiring multidimensional data corresponding to each of the plurality of regions set in the processing target image, and also performing a process for converting the multidimensional data into low-dimensional data;
   performing a process causing a display apparatus to display a display image including one or more of the plurality of regions with a plotted diagram including a plurality of plot points generated by applying different colors or patterns according to the classification result to the low-dimensional data in each of the plurality of regions; and
   performing, in a case where an instruction for selecting a desired plot point as a selected point from among the plot points contained in the plotted diagram is issued, a process related to discriminative display causing the selected point and a region corresponding to the selected point in the display image to be visually identifiable.

7. A non-transitory computer-readable storage medium storing a program executed by a computer,
   the program causing the computer to execute:

a process for acquiring a classification result of classifying each of a plurality of regions set in a processing target image into one of a plurality of predetermined classes;

a process for acquiring multidimensional data corresponding to each of the plurality of regions set in the processing target image;

a process for converting the multidimensional data into low-dimensional data;

a process causing a display apparatus to display a display image including one or more of the plurality of regions with a plotted diagram including a plurality of plot points generated by applying different colors or patterns according to the classification result to the low-dimensional data in each of the plurality of regions; and in a case where an instruction for selecting a desired plot point as a selected point from among the plot points contained in the plotted diagram is issued, a process related to discriminative display causing the selected point and a region corresponding to the selected point in the display image to be visually identifiable.

\* \* \* \* \*